United States Patent
Long et al.

(10) Patent No.: US 12,474,251 B2
(45) Date of Patent: Nov. 18, 2025

(54) SYSTEMS AND METHODS FOR FLOW CYTOMETRY WITH TAILORED DISCRIMINATION

(71) Applicant: SENTINEL MONITORING SYSTEMS, INC., Tucson, AZ (US)

(72) Inventors: Terry D. Long, Tucson, AZ (US); Richard Vercillo, Tucson, AZ (US); William H. Puent, Tucson, AZ (US)

(73) Assignee: SENTINEL MONITORING SYSTEMS, INC., Tucson, AZ (US)

( * ) Notice: Subject to any disclaimer, the term of this patent is extended or adjusted under 35 U.S.C. 154(b) by 484 days.

(21) Appl. No.: 17/886,040

(22) Filed: Aug. 11, 2022

(65) Prior Publication Data
US 2023/0047953 A1   Feb. 16, 2023

Related U.S. Application Data

(60) Provisional application No. 63/231,969, filed on Aug. 11, 2021.

(51) Int. Cl.
*G01N 15/1434* (2024.01)
*G01N 15/10* (2024.01)
(Continued)

(52) U.S. Cl.
CPC ..... *G01N 15/1436* (2013.01); *G01N 15/1404* (2013.01); *G01N 21/6428* (2013.01);
(Continued)

(58) Field of Classification Search
CPC ............................................ G01N 2021/6421
See application file for complete search history.

(56) References Cited

U.S. PATENT DOCUMENTS

| 4,284,412 A | 8/1981 | Hansen et al. |
| 4,698,308 A | 10/1987 | Ikeda |

(Continued)

FOREIGN PATENT DOCUMENTS

| JP | H03-221837 A | 9/1991 |
| JP | H08-015147 A | 1/1996 |

(Continued)

OTHER PUBLICATIONS

Yamaguchi, N., and M. Nasu. "Flow cytometric analysis of bacterial respiratory and enzymatic activity in the natural aquatic environment." Journal of Applied Microbiology 83.1 (1997): 43-52. (Year: 1997).*

(Continued)

*Primary Examiner* — Rufus L Phillips
(74) *Attorney, Agent, or Firm* — Meunier Carlin & Curfman LLC

(57) ABSTRACT

A flow cytometer can include: at least one light emitter configured to emit light in a light path; a rectangular flow cell having flow cell width that is substantially lateral to the light path and a flow cell depth that is longitudinal to the light path, wherein the light path has an interrogation width at the flow cell that is narrower than the flow cell width; and a spherical reflector positioned adjacent to the rectangular flow cell and having a concave reflective surface that has a reflective direction that is positioned substantially orthogonal with the light path such that reflected light is reflected along a reflected path that is substantially orthogonal with the light path. At least one light absorbing member is positioned at least partially around the reflected path to absorb reflected light at an angle to the reflected path.

26 Claims, 13 Drawing Sheets

(51) Int. Cl.
  *G01N 15/1404*  (2024.01)
  *G01N 21/64*  (2006.01)
(52) U.S. Cl.
  CPC ............ *G01N 2015/1006* (2013.01); *G01N 2021/6421* (2013.01); *G01N 2021/6441* (2013.01)

(56) References Cited

U.S. PATENT DOCUMENTS

| | | | |
|---|---|---|---|
| 4,745,285 A | 5/1988 | Recktenwald et al. | |
| 5,480,775 A | 1/1996 | Ito et al. | |
| 5,644,388 A * | 7/1997 | Maekawa | G01N 15/147 356/73 |
| 5,661,558 A | 8/1997 | Nogami et al. | |
| 6,184,990 B1 | 2/2001 | Amirkhanian et al. | |
| 6,414,754 B1 * | 7/2002 | Johnson | G01N 15/1456 250/222.2 |
| 8,107,067 B2 | 1/2012 | Gilby | |
| 8,377,398 B2 | 2/2013 | McDevitt et al. | |
| 2001/0016328 A1 * | 8/2001 | Rider | G01N 33/54366 435/7.2 |
| 2011/0104685 A1 * | 5/2011 | Takenaka | G01N 21/645 435/6.15 |
| 2013/0161243 A1 * | 6/2013 | Kanomata | G01N 21/05 210/85 |
| 2013/0214176 A1 * | 8/2013 | Graves | G01N 15/1434 348/335 |
| 2015/0219643 A1 | 8/2015 | Song et al. | |
| 2016/0109372 A1 * | 4/2016 | Wanders | G01N 21/05 356/40 |
| 2016/0290915 A1 * | 10/2016 | Chen | G01N 15/1459 |
| 2017/0038299 A1 | 2/2017 | Long et al. | |
| 2018/0095023 A1 * | 4/2018 | Shi | G01N 21/53 |
| 2019/0285538 A1 | 9/2019 | Furuya et al. | |
| 2020/0355611 A1 * | 11/2020 | Su | G01N 21/648 |
| 2021/0247276 A1 * | 8/2021 | Chou | G01N 15/1434 |
| 2021/0310930 A1 * | 10/2021 | Toumbas | G01N 15/0205 |
| 2022/0025470 A1 * | 1/2022 | Guillebault | C12Q 1/6895 |

FOREIGN PATENT DOCUMENTS

| | | |
|---|---|---|
| JP | 2006-250725 A | 9/2006 |
| JP | 2012000065 A | 1/2012 |
| JP | 2016142565 A | 8/2016 |
| JP | 2017-207337 A | 11/2017 |
| JP | 6459568 B2 * | 1/2019 |
| KR | 20100091916 A | 8/2010 |
| WO | 2014152867 A1 | 9/2014 |

OTHER PUBLICATIONS

PCT International Search Report and Written Opinion issued in corresponding application No. PCT/US2022/040121, dated Oct. 26, 2022.
Japanese Office Action issued in corresponding application No. 2024-508365, dated Mar. 4, 2025.
Extended European Search Report for European Application No. 22856633.7, dated Jun. 4, 2025, 7 Pages.
International Preliminary Report on Patentability for International Application No. PCT/US2022/040121, dated Feb. 22, 2024, 13 Pages.
Office Action in connection to Korean Patent Application No. 10-2024-7007931, dated Aug. 5, 2025.

* cited by examiner

SYSTEMS AND METHODS FOR FLOW CYTOMETRY WITH TAILORED DISCRIMINATION

CROSS-REFERENCE TO RELATED APPLICATIONS

This patent application claims priority to U.S. Provisional Application No. 63/231,969 filed Aug. 11, 2021, which provisional application is incorporated herein by specific reference in its entirety.

BACKGROUND

Field

The present disclosure relates to flow cytometry with systems and methods that provide for tailored discrimination between target analytes (e.g., live cells, proteins, beads, etc.) and non-target particles (e.g., non-viable cells, contaminants, other substances that are not a target).

Description of Related Art

Previously, flow cytometry has been performed with small flow rates of liquid being processed. Typically, the traditional flow cytometry system can process about 100 µL/min, which is rather small. Also, traditional flow cytometry often uses sheath flow through an analytical flow cell so that the sample being interrogated with light is in the middle of the flow, which allows the interrogation light to be directed to the middle of the flow cell. The sheath flow can provide for a lensing and focusing effect in the flow cell so that the system can obtain data without extraneous signal problems from the periphery of the glass and the flow cell walls. Flow cytometry works well when there is a high enough concentration that the cells can be identified in the low volume flow rate.

However, flow cytometry is insufficient with regard to being able to detect a low number of detectable analyte entities (e.g., cells) in a high flow rate or high volume interrogation rate. For example, when determining whether a fluid is contaminated with a microbe, such as a bacteria (e.g., an example of a cell), the concentration limits are smaller than in traditional flow cytometry. For example, applications of flow cytometry with 1 detectable analyte entity in 100 mL are not feasible with traditional flow cytometry because the flow rate is so slow it takes too long for the analysis.

While flow cytometry has been useful for laboratory settings with liquid samples being prepared for analysis, the technology has not been well established for analysis for the bioburden of a liquid sample, such as an environmental water sample or a purified water sample. A combination of low flow rates of about 100 µL/min and low sensitivity is not suitable for bioburden analysis with flow cytometry when the target microbes are in dilute concentrations. The vast majority of bioburden testing has been analyzed by using the heterotrophic plate count method wherein the sample is filtered through a membrane and then the membrane is placed onto petri dishes or agar plates filled with nutrients for growing microbes. These plates are then incubated at 37° C. for several days to promote growth and proliferation of cells which may have been in the original sample into cellular colonies with tens of thousands to millions of cells each; colonies that can be seen by the human eye and counted. This traditional method is relatively simple but extremely time consuming (e.g., multiple days) and labor intensive.

Thus, there is a need for a flow cytometry system and operational method that can be useful for analyzing a low bioburden in a liquid, such as purified water or consumable liquids. It would be beneficial to be able to have a higher flow rate for detection of a low concentration of detectable analyte entities or cells in a high volume of liquid so that quantification of the target analyte (e.g., bioburden) can be determined in a short amount of time.

SUMMARY

In some embodiments, a flow cytometer can include at least one light emitter configured to emit light in a light path. A rectangular flow cell having a flow cell width is positioned so that the flow cell width is substantially lateral to the light path and a flow cell depth is longitudinal to the light path. The light path has an interrogation width at the flow cell that is narrower than the flow cell width. A spherical reflector is positioned adjacent to the rectangular flow cell. The spherical reflector has a concave reflective surface that has a reflective direction that is positioned substantially orthogonal with the light path such that reflected light is reflected along a reflected path that is substantially orthogonal with the light path. The flow cytometer can include a light absorbing member to inhibit reflections from passing through the exit aperture. In some aspects, the flow cytometer can include at least one of: at least one light absorbing member positioned at least partially around the reflected path to absorb reflected light at an angle to the reflected path; at least one light absorbing member positioned between the flow cell and an exit aperture so as to define a light conduit therebetween; or at least one light absorbing member at least partially defines the exit aperture. In some aspects, the at least one light absorbing member includes at least one of: a tapered light absorbing surface that expands away from the flow cell; a parallel light absorbing surface that is substantially parallel with the reflected path; an orthogonal light absorbing surface that is substantially orthogonal with the reflected path; or a light absorbing material on a surface of a wall of the flow cell.

In some embodiments, a flow cytometer system can include the flow cytometer of one of the embodiments. The system can also include a sample source. The system can also include an analyte stain reservoir comprising an analyte stain composition, wherein the analyte stain composition includes a dye configured to detect a target analyte. The system can also include a counterstain reservoir comprising a counterstain composition, wherein the counterstain composition includes a dye configured to detect a non-target analyte. The system may include one or two reactors for staining a sample, and fluidic pathways connecting the flow cytometer with a stained sample preparation system, which is connected to a sample source.

In some embodiments, a kit can include the flow cytometer of one of the embodiments. The kit can also include an analyte stain having a first fluorescence wavelength. Additionally, the kit can include a counterstain having a second fluorescence wavelength.

In some embodiments, a method of detecting a target analyte in a sample can be performed with the flow cytometer of one of the embodiments. The method can include providing a stained sample having an analyte stain and a counterstain, where an analyte stain emission wavelength is distinguishable from a counterstain emission wavelength.

The stained sample can be analyzed, such as by illumination interrogation, with the flow cytometer. A potential target having the analyte stain can be detected with a data analysis computer. The data analysis computer can also determine the potential target to be devoid of the counterstain or have the counterstain below a counterstain threshold. The data analysis computer can also identify the detected potential target having the analyte stain without the counterstain or having the counterstain below the counterstain threshold as the target analyte.

In some embodiments, the flow cytometry system can include the flow cytometer of one of the embodiments. The system can also include a computer system comprising one or more processors and one or more non-transitory computer readable media storing instructions that in response to being executed by the one or more processors, cause the computer system to perform operations. The operations can include: causing a sample preparation system to provide a stained sample to the flow cytometer that has an analyte stain and a counterstain, where an analyte stain emission wavelength is distinguishable from a counterstain emission wavelength; causing interrogation of the stained sample with the flow cytometer; detecting a potential target having the analyte stain from flow cytometry data; determining the potential target to be devoid of the counterstain or have the counterstain below a counterstain threshold; and identifying the detected potential target having the analyte stain without the counterstain or having the counterstain below the counterstain threshold as the target analyte.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1A:
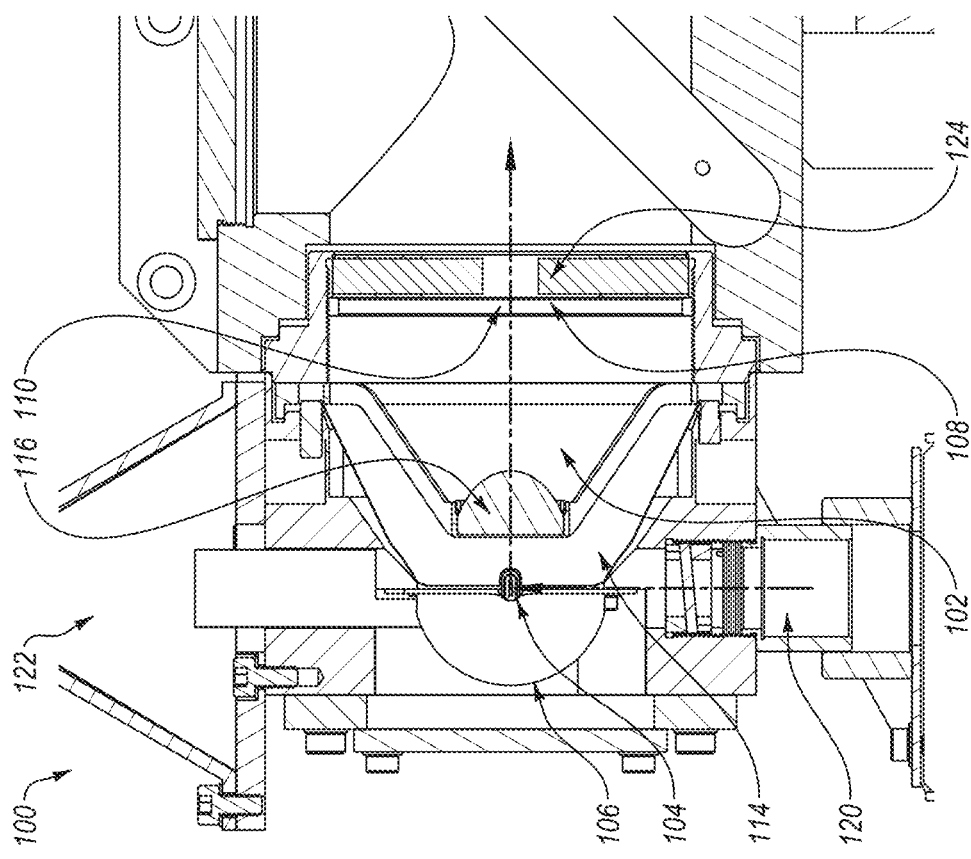
FIG. 1A is a top view that shows an embodiment of an illumination region in the flow cytometry system.
Figure 1A:
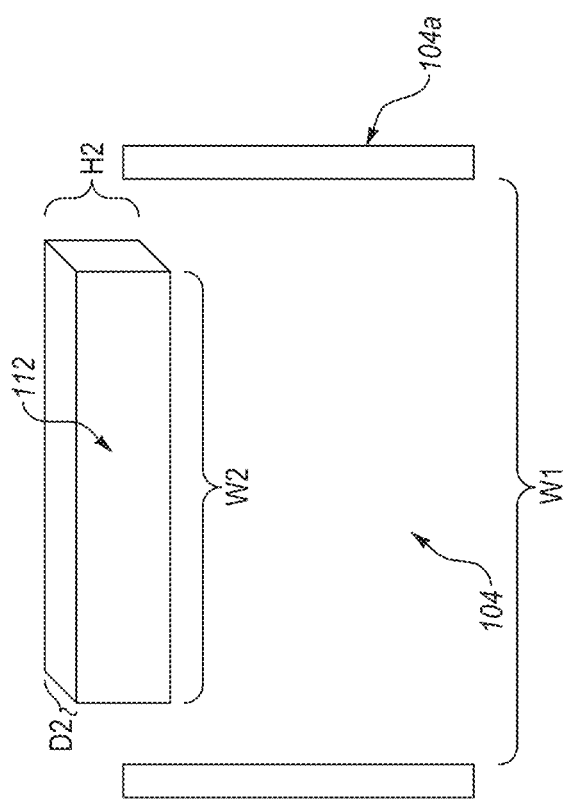

The elements and components in the figures can be arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present invention is related to a flow cytometry system and operational method that can detect a low number of analytes (e.g., cells, proteins, particles, etc.) in a high volume of fluid. For example, the flow cytometry system can detect around 1 detectable analyte entity per 100 mL (1/100 mL) in a liquid at flows of greater than 5 mL/min. The high volume interrogation rate allows for the flow cytometry system to be able to make a full analysis in a shorter time, such as within a couple of hours, which is preferably within about an hour (e.g., 40 minutes, with 2 reactor system). The short time to interrogate a high volume of sample liquid allows for the economic feasibility of using flow cytometry for analysis of low concentration samples. However, the flow cytometer and system described herein can be used in any traditional flow cytometry analysis. The sample can be any type of sample, from foods and beverages to manufactured compositions, to natural liquid, to various types of water, whether unpurified or purified. Another example can include monitoring the rapid release of an analyte from a manufactured composition (e.g., zero-order release from drug depot).

The flow cytometry system can be configured to perform the analysis in a high flow rate without using sheath flow during the light (e.g., laser, light emitting diode (LED), high intensity light emitting diode (HLED) high intensity discharge—"HID," halogen, incandescent, or other as well as combinations and arrays of the same) interrogation. The flow cell is configured in a way with size and shape so that the interrogating light does not pass through lateral side walls and no sheath flow is used. Instead, the interrogating light (e.g., one or more light emitters) is placed in a position so that the light passes through a middle region of the flow cell without passing through lateral regions of the flow cell. For directional purposes, the light direction defines a longitudinal direction such that the lateral direction can be at an angle, such as orthogonal, from the longitudinal direction. The light can be shaped to be in a beam or otherwise have the width that is narrower than the flow cell width, where lenses or other optical components can be used to shape the light, whether laser or other type of light emitter. While laser interrogation is described herein, it should be recognized that other light, such as shaped HLED with lenses can also be used for interrogation.

Additionally, traditional flow cytometry often uses labels (e.g., dyes, such as fluorescent) that are specific to the target that is being analyzed, which can be used in the present flow cytometer. For example, in a laboratory setting the flow cytometer often uses specific labels for tagging specific types of analytes (e.g., cells), such as a specific target species that has a receptor for a ligand linked to the label. This label strategy may work when the target analytes are known so the label can be configured to specifically bind with the target, but is not useful when the analyte types are unknown, such as in a bioburden analysis. An example includes different stains that mark certain types of analytes and not others.

In order to be useful with samples with unknown types of analytes, the present flow cytometry system can also use dye combinations that are useful for detecting a broad range of different types of analytes (e.g., cells of different microbial species) in a high volume of sample with the high volume analysis with discrimination from non-target analytes, such as non-viable cells or other undesirable particles (e.g., plastic, rubber, metal debris). Accordingly, a dye combination is provided that allows for detection of a target analyte (e.g., live cells) without highly specific targeting of specific analytes. In some aspects, the dye combination provided herein allows for detecting a low bioburden (e.g., low concentration of microbes) in a high volume flow rate, with or without a targeting moiety that binds the target analytes. For example, the dye combination can include a dye that labels cellular material (e.g., DNA dye) and a counterstain that can only stain cells that are compromised or dead, such as the counterstain leaking into a cracked or otherwise compromised cell. The presence of the cell stain (e.g., DNA dye) being detected indicates a cell, and the presence of the counterstain being detected indicates the cell is dead. The presence of only the DNA stain being detected (or detected below a threshold) can indicate that the cell is present and alive. The presence of only the counterstain being detected indicates the material having the counterstain is not a living cell. The analyte stain can be used to target an analyte, and the counterstain can be used to target other substances/particles that are not the analyte. While cells are used herein as an example analyte, it should be recognized that the any reasonable substance or particle may be a target analyte to be discriminated from non-target analytes or substances/particles in a sample.

The dye combination and configuration of the flow cytometer allows for interrogation sensitivity down to 1 detectable analyte entity per 100 mL. However, it should be recognized that the dimensions and flow rates may be modulated so that a higher flow volume can be achieved, such as by widening the flow cell or having more depth to the light path in the flow cell so that a higher flow rate is achieved for higher volume analysis. This may allow up to 1 detectable analyte entity per 100 mL, 200 mL, 500 mL or up to 1 L.

In some embodiments, the flow cytometry system is configured for broad detection of biologics (e.g., live cells) from non-biologics (e.g., dead cells), abiotic materials (e.g., not derived from a living organism), or inert materials (e.g., machine particles from wear) in a sample. The dye combination is configured to broadly label living cells in a way to be distinguished from non-living cells and particles, such as the microscopic particles, such as stainless steel, gasket material, rubber, or other materials. The dye combination is configured to mark living cells differently from dead cells or particles through the analyte stain being capable of being discriminated from the counterstain. This allows for detection limits down to 1 microbe out of 10,000 detectable particles, and for example distinguishing *E. coli* from Teflon. However, the modifications can allow for detection of 1 microbe out of 20,000 detectable particles, 30,000 detectable particles or up to 50,000 detectable particles. However, it should be recognized that any type of analyte that can be stained selectively compared to the other substances/particles in the sample can be the target to be detected and discriminated from the other substances/particles. Also, a counterstain can be configured to be able to use the analyte stain to discriminate target analytes from non-target analytes. For example, the counterstain may not stain the target analyte, or may stain it weakly/lightly so that the stained target analytes can be determined from others.

In various flow cytometry systems and methods it has been standard thought that detecting every photon of a signal is important. However, it has now been found that trying to detect every photon in a sample for bioburden analysis is not suitable. Now, the flow cytometry system can be configured to reduce the percentage of available photons that are acquired and used in the bioburden analysis. The system can obtain lower percentages of photons in a way that reduces the impact of noise signals or non-valuable light.

Many flow cytometry systems use Mie scattering for particle detection. However, the present flow cytometry systems are configured to analyze samples without Mie scattering analysis, and omit any particle sizing analysis. The present system omits Mie scattering analysis so that the particle sizing data is not obtained and used for particle discrimination. It has been found that omitting the particle sizing data analysis reduces confounding of the obtained label data. Previously, the Mie scattering signal was analyzed first for particle size analysis and then once a particle size within a defined range is determined, the systems looked for a label signal for the particle. This strategy has been found to be difficult in data analysis. Now, the present flow cytometry system does not perform particle sizing analysis, such as Mie scattering. Accordingly, aspects of the present flow cytometry system omit Mie scattering analysis and only use label detection analysis from the dye combination (e.g., analyte stain versus counterstain). It has been found that omitting Mie scattering or other particle sizing analysis is beneficial because the cells are not solid spheroids and do not generate predictable Mie scattering signals. This allows for the present flow cytometry system to rely on fluorescence detection of the labels in the dye combination. Also, other particles may not be suitable for particle analysis, and thereby particle analysis and associated devices and systems can be omitted.

In some aspects, the flow cytometry system does not use any analysis other than the florescent signal analysis of the dye combination so when a particle or other analytes goes through the flow cell, the system excites any label so that the fluorescence can be detected. Accordingly, using at least two spectral regions of the analyte stain and the counterstain is sufficient for interrogating whether a particle is a target analyte (e.g., live cell) or not. While a two dye system of the analyte stain (e.g., stains target analyte) and the counterstain (e.g., does not stain target analyte) can be used, additional dyes can also be used to expand the analysis for tailored discrimination of the target analyte from other particles/substances. In some aspects, the dye combination set can be configured with the analyte stain and the counterstain in two separate wavelength ranges.

The flow cytometry system can be applied for determining bioburden of liquids, such as in foods, beverages, pharmaceutical preparations, biological samples, ultrapure water, or the like. For example, it can be important for ultrapure water to have a low number of microbes. As such, the sample may be filtered so that large particles are already filtered out, which reduces the importance of Mie scattering and particle size analysis. The analysis can be between live/viable and dead/unviable microbes, where there may be dead microbes present (e.g., from the purification process). The dead microbes can still be identified with the analyte stain fluorescence. This allows for the counterstain to be a viability stain, where if counterstained the cell is not viable. For example, the analyte stain (e.g. DNA stain) can emit one color and the counterstain can emit a different color, however, most combinations can be used, such as different combinations of yellow, red, green, blue, violet, orange, or others. In an example, the color combination allows for probing of whether or not the counterstain penetrates into a cell, and if it does then the cell is likely not viable. This allows for the system to discriminate between cells with both stains from those with only the cell stain. In another example, the color combination allows for targeting a specific particle type with the analyte stain and targeting a different particle type with the counterstain. The less counterstain in a target cell analyte, the more likely a cell is alive and viable. The less counterstain on a particle/substance having the analyte stain, the more likely the particle/substance having the analyte stain is the target. The more counterstain usually indicates the cell is dead or the non-target analytes are present. Accordingly, the counterstain is configured so that it does not penetrate significantly into a live cell that is substantially uncompromised, or it does not significantly stain the target analyte.

In an example, the emission colors can be picked so that one color is a nucleic acid stain or stain for another substance in the cell, and the counterstain can be one that merely permeates into a cell to stain the cell once the cell membrane is compromised or cracked. Otherwise, the counter stain can only stain the outer surface of the cell, resulting in a reduced signal. Examples of analyte stains can include Thiazol Orange, GelRed, Hoechst, SYBR (different colors, green, gold), ethidium bromide, acridine orange, or others. Examples of counterstains can include the Live/Dead stains from ThermoFisher scientific (various colors), Live-or-Dye stains from Biotium (various colors), ethidium monoazide, DAPI, Sytox Blue, Sytox Green, Sytox Red, ethidium homodimer-1, propidium iodide, 7AAD, PO-Pro-1, YO-Pro-1, AnnexinV (different colors), erythrosine B (EB) or others. The stains can also be configured for non-cell applications, such as detecting a target protein, drug, or other substance.

In one example, the analyte stain can be used to create a green signal that has an excitation peak of about a first wavelength, which is being excited by the laser at an excitation wavelength, with a florescence response having a peak of a second wavelength, where there may be a small spectral difference between the excitation and the emission peak. As such, the system can include a notch filter 137 (FIGS. 1B-1C) that transmits some light and blocks as much light as it can that is not in the wavelength range window (or other band with different dyes). This provides a colored signal that is quite low in intensity relative to the counterstain that provides a different colored signal. This is a small spectral region that is collected because there is more fluorescent light that is being generated by the dye but the signal starts to get confounded. This allows for focusing only on that area directly around that peak emission and it gives better quality information. In some aspects, the amount or concentration of analyte stain can be significantly less than the counterstain, so that the signal of the analyte stain is smaller than that of the counterstain, or vice versa. In some examples, the counterstain dye can be a red color to provide a red channel, which is basically a wide spectrum. The system collects all the light from a certain wavelength range, which is large compared to the spectrum of the analyte stain channel. This allows for better discrimination between target analyte (e.g., viable cells) and non-target analyte (e.g., viable cells or particles).

The flow cytometry system can be configured to determine a percentage of counterstain that penetrates into a detectable target analyte (e.g., viable cell) or otherwise stains the target analyte. There can be a counterstain percentage threshold that is established for discrimination between target analytes (e.g., live cells) and other substances (e.g., non-viable cells) so that target analytes above the counterstain percentage threshold are indicated to be non-targets (e.g., non-viable cells) and labeled target analytes that are below the counterstain percentage threshold are indicated to be the target analyte. The counterstain percentage threshold may be defined or set to be different values in different samples or testing protocols. It should be clear to those in the art that the area of each signal as well as other data analytics could be used equally instead of intensity.

In some embodiments, the ratio of the analyte stain signal to the counterstain signal can be used for the discrimination analysis. This allows for the ratio in a certain range to be determined to be a target analyte (e.g., live cell), and a ratio outside of the certain range can be determined to be a non-target analyte (e.g., other substance, such as dead cell or non-biological particles). The ratio can be determined from the raw signals or from tuned signals for the analyte stain relative to the counterstain. The ratios of the area under the curve and/or peak intensities can be then used to discriminate between target analyte (e.g., viable cells) and non-target analytes (e.g., non-viable cells).

In some embodiments, the obtained signals can be processed to omit some of the light signal data. Instead of acquiring all of the light for analysis, a selective region of the light signal data is obtained for analysis. This processing can make the desired light signals better while turning down the noise. This allows for enhanced discrimination between target analyte (e.g., viable cells) from non-target analyte (e.g., non-viable cells). This also allows for empirical optimization of two different signals concurrently.

In some embodiments, the flow cytometer can be configured to inhibit total internal reflectance (TIR) in the system so that less background light is collected by the detectors. For example, light that is emitted and hits a wall can be reduced by coating the internal aspects of the device with a light absorbing material, such as a black body material. This reduces the total light and can help condition the signal. As such, light that is emitted through a flow cell wall at an angle above an angle threshold, such as about 43 degrees, is absorbed and not reflected in a way so that the photons are not counted (do not provide a record). This can avoid the mirror effect of light and avoid collecting generic light from the glass, water, and anything else that may emit/reflect light. The tailoring of the collected light can be used for collecting the better light for analysis. For example, an analogy can be that the configuration of the light collection allows for selectively obtaining the "heart cut" of the light, which is the important light for the data analysis described herein. Non-important or non-useful light can be omitted from collection and/or use by absorption.

The configurations of the flow cytometry components is described herein and in the incorporated references with the modification that the system reduces the collection of any reflected light or non-ideal light. The flow cytometry system generally uses a rectangular flow cell with a rectangular internal cell chamber (e.g., rectangular cross-sectional profile area orthogonal with the flow of sample through the flow cell) coupled with a spherical reflector (e.g., half ball) and surrounded by light absorbing materials. The shape is rectangular, which can be a perfect rectangle or substantially a rectangle with some variations, such as rounded corners that have a radius. The overall shape of the internal chamber of the flow cell, which operates to have the flow, is rectangular, where the corners can be rounded and not perfectly orthogonal. This combination is a non-spherical flow cell with a spherical reflector (e.g., reflective surface is concave as inside of sphere). The flow cell can be interrogated with a narrower light beam width so that reflected light is minimized, which may reduce the noise signal.

The configuration of the flow cytometer can reduce the amount of light collected to be less than 50% of total light, less than 40% of total light, less than 30% of total light, less than 25% of total light, or up to less than 20% of total light that could be collected without absorption.

Additionally, the flow cytometry system can include a means for reducing the size of the collection area. This reduces the amount of light that is able to get to the detector. As such, a constrictor can be placed in the light path to reduce the collection area. For example, the constrictor can choke the light signal to reduce the exit portion of light that can travel to the detector. For example, a 50 mm collection system can be reduced by the constrictor down to 25 mm for the exit. The constrictor and/or light absorbing materials can help reduce the amount of total collected light, which can reduce the noise relative from reflections to the target emitted signal from viable cells.

FIG. 1A is a top view that shows an embodiment of an illumination region 102 in the flow cytometry system 100. The system 100 shows the rectangular flow cell 104 (with flow path going into and out of the plane of the page, perpendicular to plane of page) with the spherical reflector 106 and constrictor 108 for the light path aperture 110. The flow cell 104 is enlarged to the left of the system 100 to show the shape and dimensions, such as the flow cell 104 can be 2200-2400 μm wide (W1) compared to the interrogation region 112 (region impacted by laser(s)). As can be seen, the interrogation region 112 is shown to be 2000 μm wide (W2), which is significantly less than the width of the flow cell 104 (e.g., 200-400 μm narrower, and the interrogation region having a height of 50 μm (H2) and a depth of 500 μm (D2)). However, it should be recognized that the dimensions can be modulated (e.g., +/−1%, 5%, 10%, 25%, 75%, etc.), such as narrower flow cell or wider flow cell for the plane perpendicular to the interrogating light beam, where the width of the interrogating light beam is smaller than the width of the flow cell. For example, the light beam width can be shaped to have an edge that is within the flow cell without contacting the flow cell wall, such as having a gap between the light beam edge and flow cell wall of at least 10 μm, 20 μm, 30 μm, 50 μm, 75 μm, 100 μm, 150 μm, 200 μm, or more.

This results in the laser (or other interrogating light) avoiding the capillary walls 104a of the flow cell 104 and only interrogating the middle region of the flow cell as the interrogation region 112. The spherical reflector 106 is on the backside of the flow cell 104 and the constrictor 108 and light path aperture 110 are on the front side of the flow cell 104. The system 100 can omit a front side reflector, typically located at the location where now a first absorber 114 is located. The spherical reflector 106 is a rear reflector so by definition it is positioned for the rear light, so that is why it is the half sphere shape in the back region. A first absorber 114 can be positioned around the light path from the spherical reflector 106, which first absorber 114 is shown as conical shaped, but can be another shape, such that the light passes through the light path (e.g., aperture) of the first absorber 114 and other light is absorbed.

The first absorber 114 is configured as a light absorber that absorbs light (photons) that make contact therewith, which inhibits reflection. The first absorber 114 and other absorbers described herein can be a black body material to absorb the photons so the illumination region 102 is not getting any reflection from the walls or surfaces thereof.

The illumination region 102 includes a collection lens 116 that facilitates focusing the light toward the light path aperture 110. Accordingly, the collection lens 116 collects light and directs the light out the exit aperture 110. The first absorber 114 is adjacent to the collection lens 116 to inhibit reflected light from contacting the collection lens 116, by absorbing the light to inhibit reflections. The first absorber 114 inhibits any non-coaxial light from reaching the collection lens 116, which inhibits forward scattered light. In an example, the black body material of the first absorber 114 can be Acktar black coating (Acktar)—light absorption materials and coatings that provide solutions for the suppression of stray light in wavelengths VIS, SWIR and MWIR. The material can be super black materials (blackest black), black foils and direct coatings for the blackening of opto-mechanical components. The first absorber 114 optimizes the fluorescent signal by eliminating reflected light, such as forward reflected light, and by reducing reflected light the light has loss from reflection, which can improve the signal to noise ratio. This removes noise and background so that the desired signal is more prominent and detectable and distinguishable.

The result is a high quality signal that can be utilized in radiometric analysis for the signal intensity. Traditional flow cytometry has a 2 dimensional space where data processing results in clouds because of the distribution of the signals is significantly dispersed, and the system does not get a tight cloud, which typically results in a fairly dispersed cloud. Contrary to traditional flow cytometry, the present invention obtains concentrated regions that are not as dispersed to provide a refined cloud area. The refined signal response area helps make a discrimination between target analyte from non-target analyte, such as viable cells from non-viable particles.

As shown, the interrogation region 112 is narrower in the lateral direction than the width of flow cell 104 between the capillary walls 104a. The interrogation region 112 can be about 2000 μm (2 mm) in width (across or lateral) and about 200-600 μm thick (or deep for depth) (e.g., about 400 μm)

and about 20-90 μm high (e.g., 50 μm), or +/−1%, 5%, 10%, 25%, 75%, etc. of these values. This provides a significantly larger interrogation region 112 than typical flow cytometry. This large interrogation region allows for higher processing, which can be a high flow rate of about 5 mL/min to analyze 100 mL in a short amount of time. For example, the system can operate for 20 minutes to interrogate 100 mL sample. This allows analysis of a sample at more than 1 mL/min without sheath flow. Omitting sheath flow significantly reduces the required supplies, waste, system complexity and other problems. Omitting sheath flow can be performed by reducing the interrogation region 112 to be smaller than the flow cell 104 so that the capillary walls 104a do not receive laser light and do not reflect light or otherwise negatively impact the signal quality from any labeled material in the sample. While the edges of the flow are not interrogated, the large area of the interrogation region 112 and large flow rates allows for accurate detection. This omits any reflection from the corners or capillary walls 104a, and reduces light stress or background light noise in the system. For example, the interrogation region 112 can be about 100 μm inward from the capillary walls 104a, or at least 10 μm, 20 μm, 30 μm, 50 μm, 75 μm, 150 μm or 200 μm or more gap between the closest wall 104a and interrogation region.

In some instances, the thickness of the interrogation region 112 can be reduced to reduce the flow area, which can reduce the flow rate. However, the width of the interrogation region 112 is still large but narrower than the width of the flow cell 104.

As an example, the system reduces the amount of light that is measured compared to the exciting light. The laser may emit light at $10^{16}$-$10^{17}$ photons; however, the system described herein receives about $10^2$-$10^3$ of photons, which is a significant reduction. Thus, the blackened surfaces inhibit reflection of light, and thereby inhibit degradation of the signal.

FIG. 1A also shows an excitation blocking filter 124, which is downstream from the exit aperture 110, where the light that passes through the aperture 110 is filtered, such as described herein. The blocking filter 124 keeps any stray excitation light from going further down the detection path toward the detectors.

FIG. 1A also shows that the flow cytometry system 100 uses orthogonal light activation of the dyes, where the laser light direction is at about 90 degrees from the light collection direction. FIG. 1A shows the laser emitter 120 on one side of the flow cell 104 and a passthrough collector 122 (e.g., coated with blackened light absorbing member) on the other side of the flow cell 104 opposite of the emitter 120. This arrangement has a laser path that is about 90 degrees relative to the emission light path that goes through the collection lens 116 and through the aperture 110. This configuration is suitable in view of the omission of using Mie scattering for particle sizing, where coaxial interrogation laser and fluorescent emission is coaxial. It has been found that the efficiency is improved for the excitation path to be about 90 degrees from the collection path. A general description of the orthogonal arrangement can be found in U.S. Pat. No. 4,745,285, incorporated herein by specific reference.

The passthrough collector 122 is configured to absorb and kill any laser light (photons) that passes through the flow cell 104. As shown, the passthrough collector 122 is a cone shape. However, the passthrough collector can be flat or rounded, and coated with the black body material (absorber), have other shapes with an interior coated with the black body material (absorber), or be other excitation light mitigating methods utilized by those in the art.

Figure 1B:
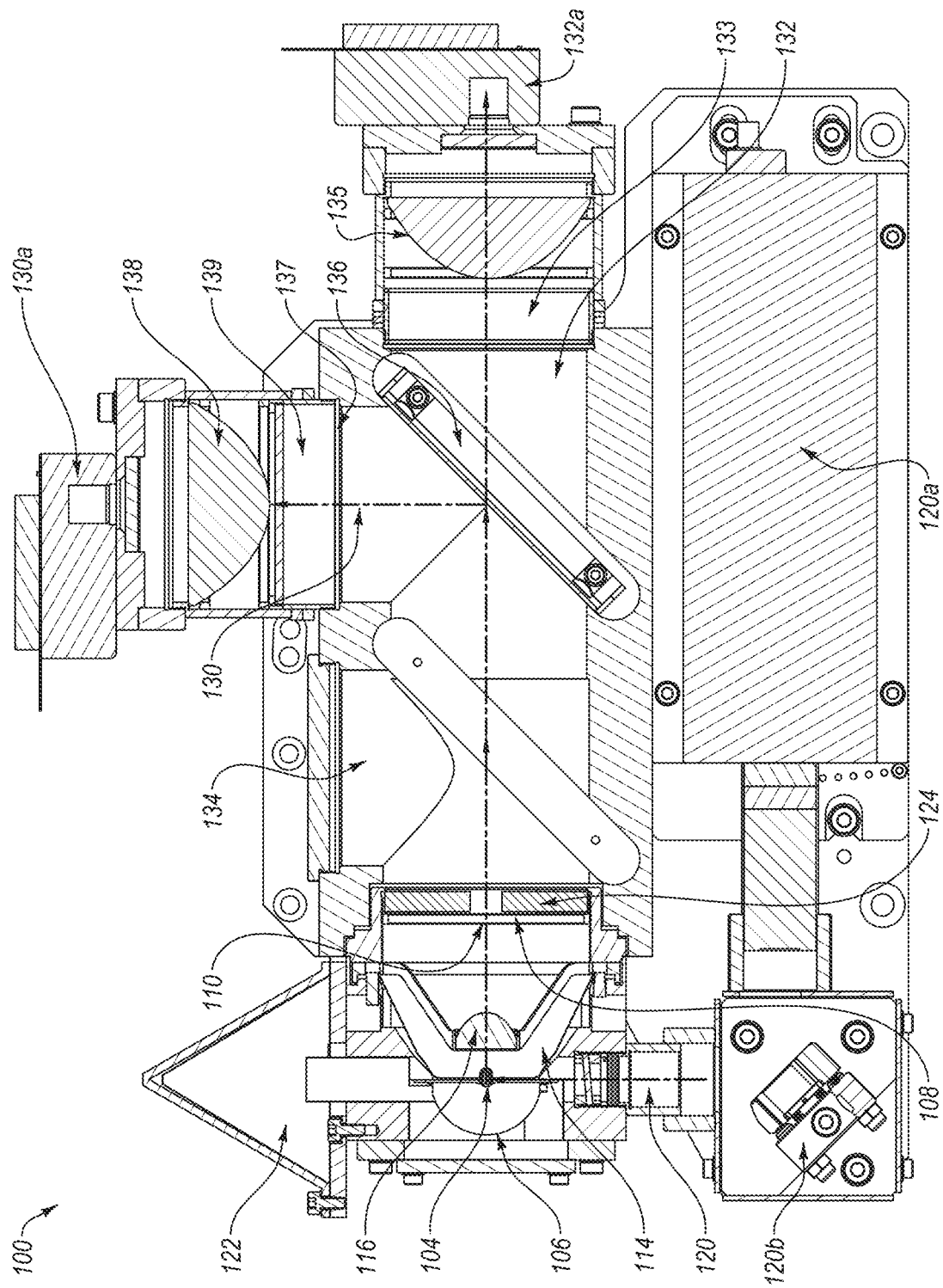
FIG. 1B is another top cross-section view that shows additional regions of the flow cytometry system.

FIG. 1B is another top cross-section view that shows additional regions of the flow cytometry system 100. The flow cell 104, spherical reflector 106, constrictor 108, aperture 110, first absorber 114, lens 116, laser emitter 120, and laser passthrough collector 122 are shown as in FIG. 1A. Additionally, FIG. 1B shows only two collection channels 130, 132 that are separated by a beam splitter 136, but there may be more collection channels such as with the extra channel region 134 as shown, however any number of collection channels can be used. The number of collection channels can be the less, more or the same as the number of different dyes in the dye combination set. The two collection channels 130, 132 have different wavelengths of light passing therethrough due to the beam splitter 136. For example, the beam splitter 136 separates green light from red light. The beam splitter can be the filter as described herein with the selective separation of the green spectrum from the red spectrum. The beam splitter 136 can be at about 45 degrees relative to the light path, with the green light reflecting to the first collection channel 130 and the red light going to the second collection channel 132. The first channel detector 130a and second channel detector 132a are shown.

The laser emitter 120 is shown to be coupled to the laser generator 120a through a movable mirror 120b.

The first collection channel 130 includes a notch filter 137 that reduces the bandwidth, such as to 510-535 nm. The filtered light from the notch filter 137 goes through a first channel lens 138. A first channel absorber 139 (black body light absorber) is downstream from the notch filter 137 before and optionally around the first channel lens 138. The second channel 132 omits a notch filter or similar spectral constraining filter element in this embodiment, but includes a second channel lens 135 and second channel absorber 133 (black body light absorber).

Figure 1C:
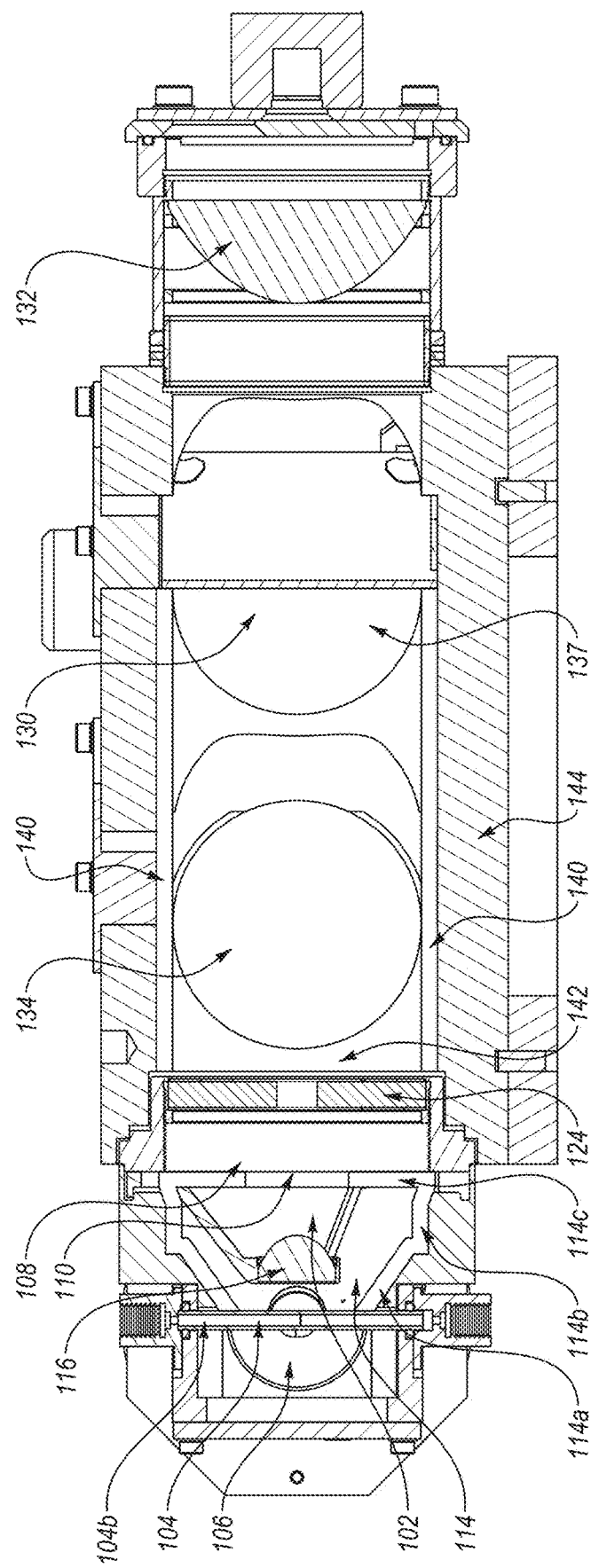
FIG. 1C is a side cross-section view (e.g., orthogonal with FIG. 1B) of the flow cytometry system.

FIG. 1C is a side cross-section view (e.g., orthogonal with FIG. 1B) of the flow cytometry system 100. Here, the sample pathway 104b is shown with the flow cell 104 being elongated along the plane of the page. Here, the first absorber 114 is expanded in shape to be encompassing of the illumination region 102 from the flow cell 104 to the constrictor 108. Here, the first absorber 114 covers the walls internal region of the illumination region so non-coaxial light or angular light strikes the first absorber 114 without reflection. The first absorber 114 is shown in cross-section, but can be coated around the region so that the optical path is clear and so that the aperture 110 is clear without the black body material. As shown, the first absorber 114 includes a tapered region 114a, a longitudinal region 114b, and a lateral region 114c that forms aperture 110 between portions of the lateral region 114c. However, other shapes can be used for the first absorber 114 to cover internal surfaces of the illumination region 102 to block reflection. Here, the aperture 110 is about 25 mm, but may be from 20-30 mm, 15-40 mm, or 10-50 mm wide.

Additionally, FIG. 1C shows a second absorber 140 (black body light absorber) that is downstream from the first absorber 114 and aperture 110. The region of the system 100 downstream from the aperture 110 is a main channel 142 with sidewalls 144 that are coated with the second absorber 140, at least partially, and preferably fully coated with light absorber material.

Figure 1D:
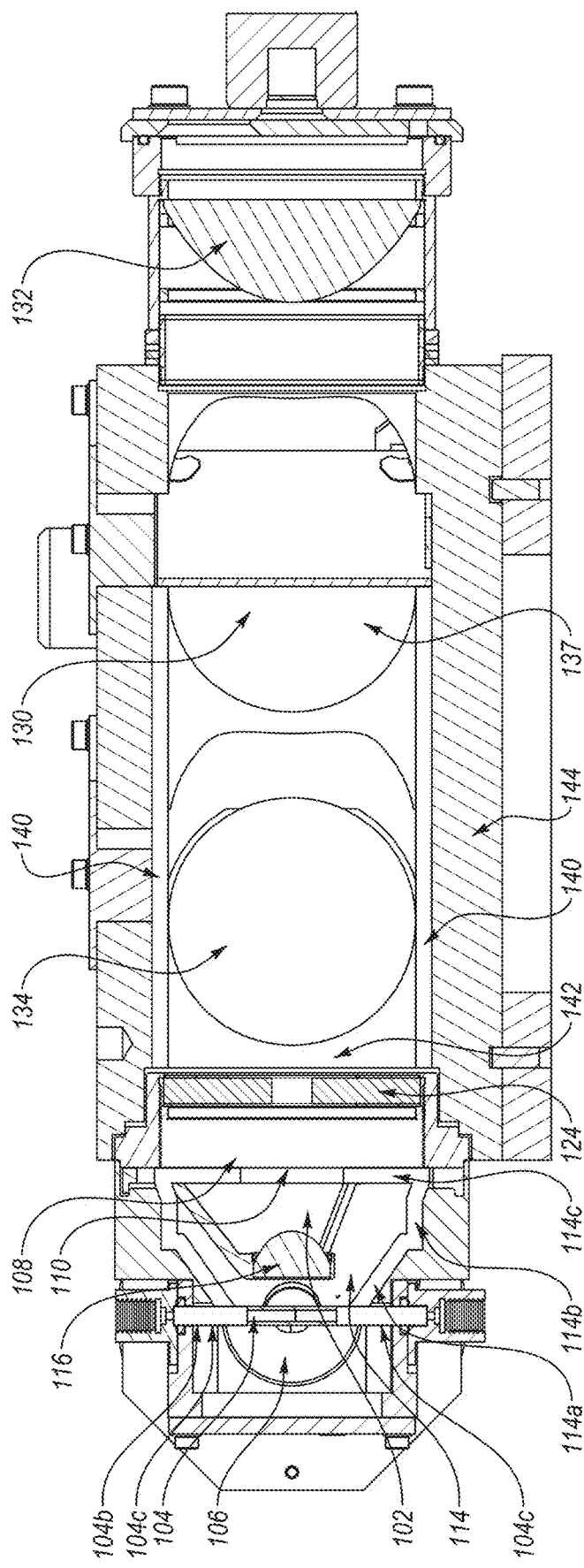
FIG. 1D shows a light absorber that can be coated around the exterior walls of the flow cell.
Figure 1E:
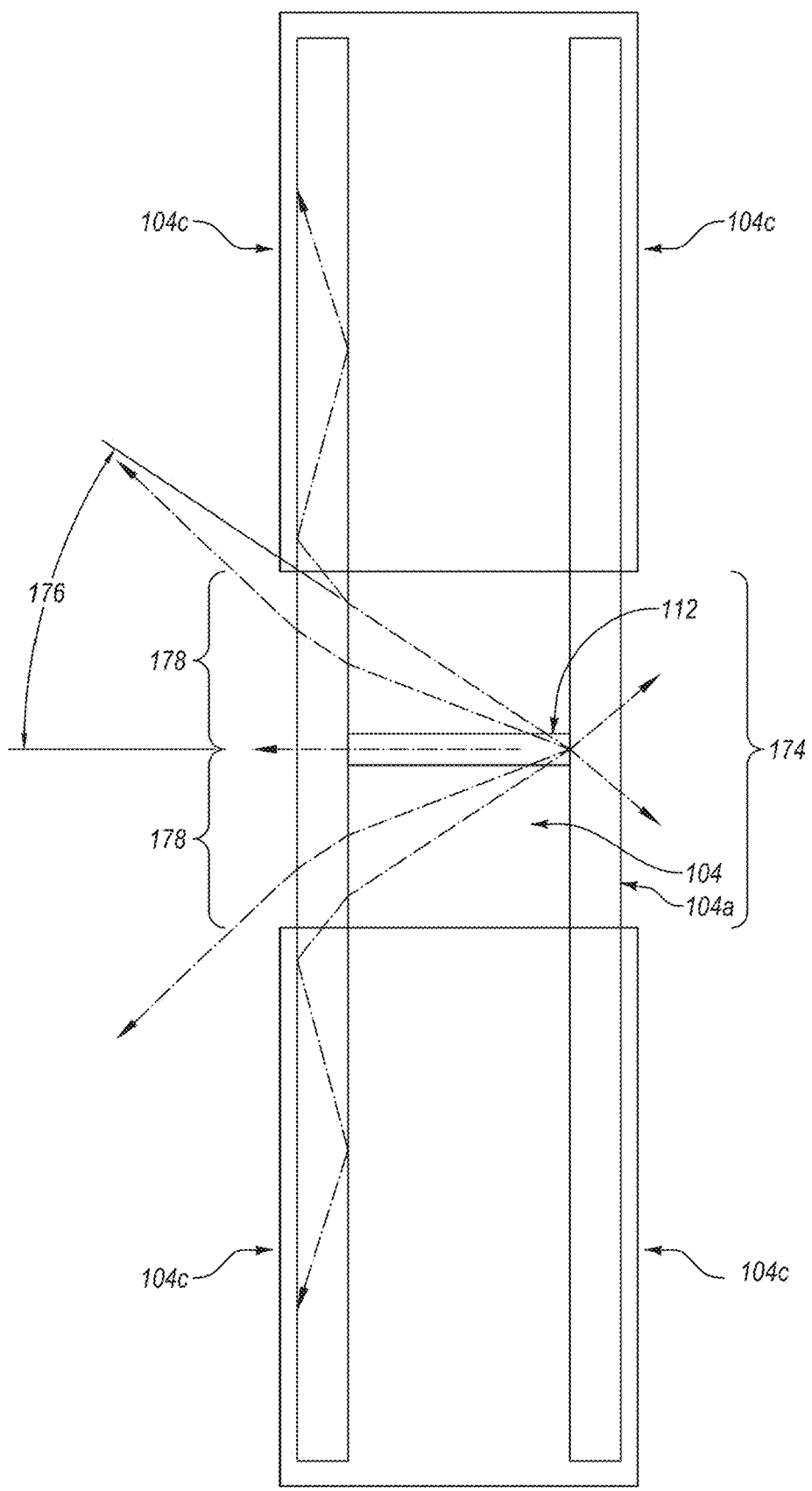
FIG. 1E is a cross-section of the flow cell that has the light absorber on the flow cell wall.

FIG. 1D and FIG. 1E also show a third absorber 104c that can be coated around the exterior walls of the flow cell 104 encapsulating the areas of the flow cell where light that is emitted through a flow cell wall at an angle above an angle threshold, such as about 43 degrees, is absorbed and not reflected in a way so that the photons are not counted. FIG.

1D also shows that the flow cell 104 can have a light absorber 104c (e.g., third light absorber) on some of the regions in order to inhibit light from escaping from these regions. The third light absorber 104c can be a black body in the same region as the first light absorber 114, and may be of the same material, and may be a continuous coating or a separate coating. The third light absorber 104c is located on a flow cell holder that is adjacent to the flow cell 104 or around the flow cell 104, which inhibits any reflection or refraction from the flow cell walls 104. The third light absorber 104c can be part of the device or part of the flow cell 104, such that the regions around the interrogation region 112 can be blacked out and non-reflective.

FIG. 1E shows the cross-section of the flow cell 104 that has the third light absorber 104c on the flow cell wall 104a. The open region of the flow cell wall 104a between the two third light absorbers 104c allows light to pass through for operation of the flow cytometer. The light greater than a defined angle will be absorbed by the third light absorber 104c, as shown. The interrogation volume defined by the excitation beam is shown for reference scale; however, the dimension between both the regions of the third light absorber 104c may be modified down to about the same height as the interrogation volume defined by the excitation beam. Therefore, the angle of light beams that are absorbed and blocked from exiting the flow cell can be modulated to accommodate more or less light, as needed for operations and data analysis or as desired. The angle of light may be the TIR angle of about ~43°. This provides a preferred light emission zone 174 between the two regions of the third light absorber 104c. It should be noted that the internal walls of the flow cell could also be coated with light absorbing material, or both the internal walls and external walls of the flow cell can be coated. The TIR can be the angle which total internal reflection occurs. As shown, the clear area of the flow cell extends above and below the excitation beam up to the TIR angle of the flow cell. There can be a masked section of the flow cell from the third light absorber 104c.

In some embodiments, the length of the flow cell optical window can be shortened to be only the length of the preferred light emission zone 174, where the flow cell can include some regions of light absorbing material or omit the light absorbing material when the flow cell is not long enough to have undesirable light angle emission. That is, the flow cell length (e.g., height of interrogation volume by shaped light), can be the same as the height of the preferred light emission zone 174. The height of the preferred light emission zone 174 can be the full height of the interrogation zone plus a distance that is less than the TIR angle (~43°) height 178 above and below the light beam axis 176. In an example, with a 3,500 μm width for a flow cell, the preferred light emission zone 174 can have about a 6,578 μm height. However, these dimensions can be modified as needed (e.g., +/−1%, 5%, 10%, 25%, 75%, etc.). The preferred light emission zone 174 may have a height as desired. It should be noted the light emission zone 174 may be dimensioned as described herein by use of the third light absorber 104c or other light blocking member.

Additionally, it should be recognized that some of the dimensions can change or be modified, such as the diameter of the aperture 110 relative to the dimension of the main channel 142. The main channel 142 can be larger than the aperture 110, such as 50 nm to 25 nm, or 25 nm to 20 nm, or even 25 nm to 23 nm. The ratio of the diameter of the main channel 142 to the diameter of the aperture 110 can vary. The aperture 110 can function as a pinhole relative to the main channel 142.

In some embodiments, the spherical reflector 106 is a half sphere. In some aspects, the spherical reflector 106 is not a parabolic reflector. It is thought, without being bound thereto that the spherical reflector 106 as a half sphere with the rectangular flow cell 104 provides an advantage in enhanced columnar 'heart cut' light through the aperture 110 compared to other reflectors, such as an elliptical or parabolic reflector. Other reflector concepts tuned to reflect the desired light preferentially to the background light are contemplated herein.

In some embodiments, the flow cytometry system is optimized with the dye combination set. The system has been optimized and tuned with the analyte stain and the counterstain, such that the collection optics and the configuration of amplification of the signals once they get to the photomultiplier tube (PMT). The optimization provides straight forward discrimination logic using an algorithm.

Figure 2A:
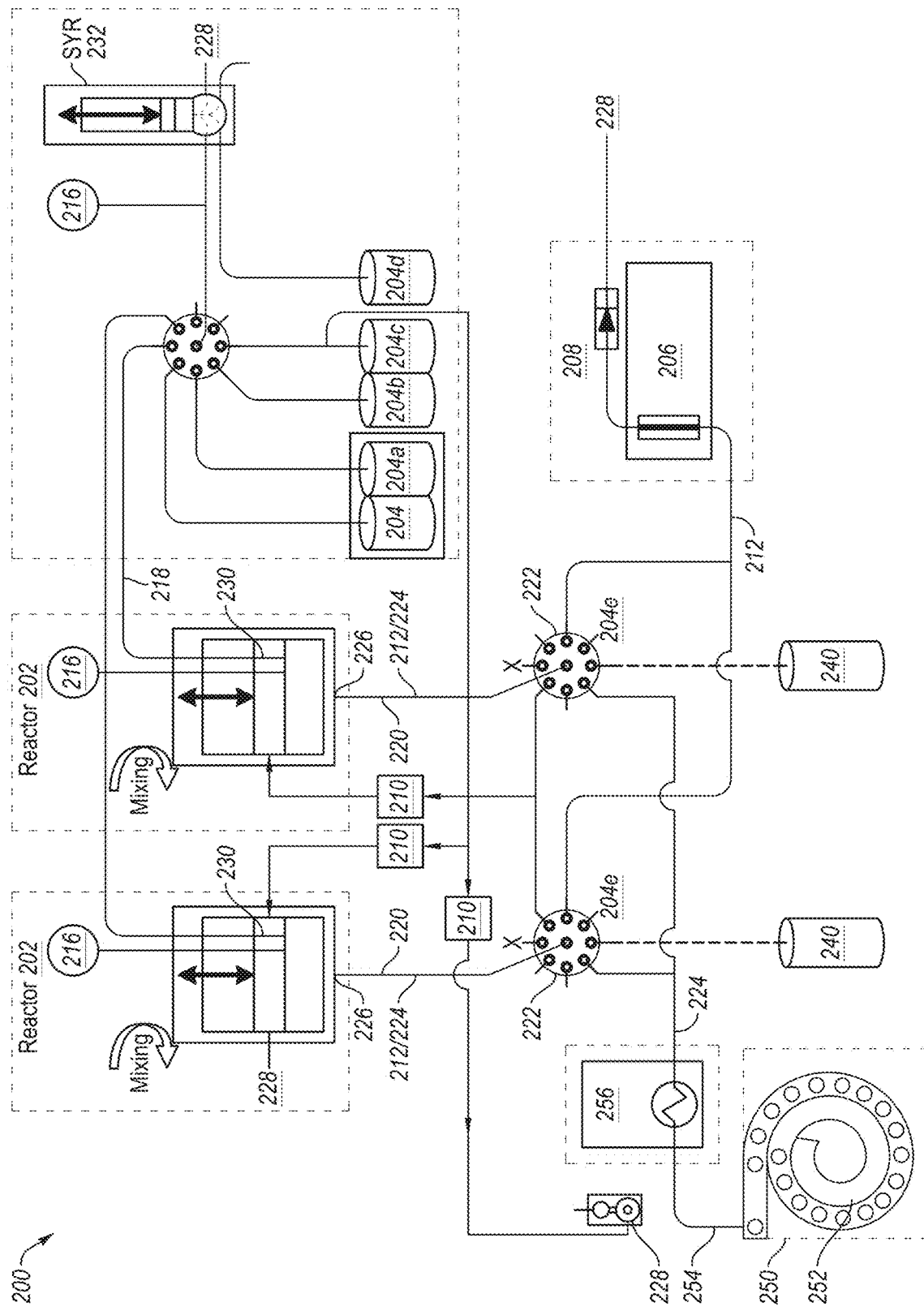
FIG. 2A shows an example of a full assay system that includes the flow cytometer of the embodiments described herein, a sample source, and a stained sample preparation system having two separate staining reactors.
Figure 2B:
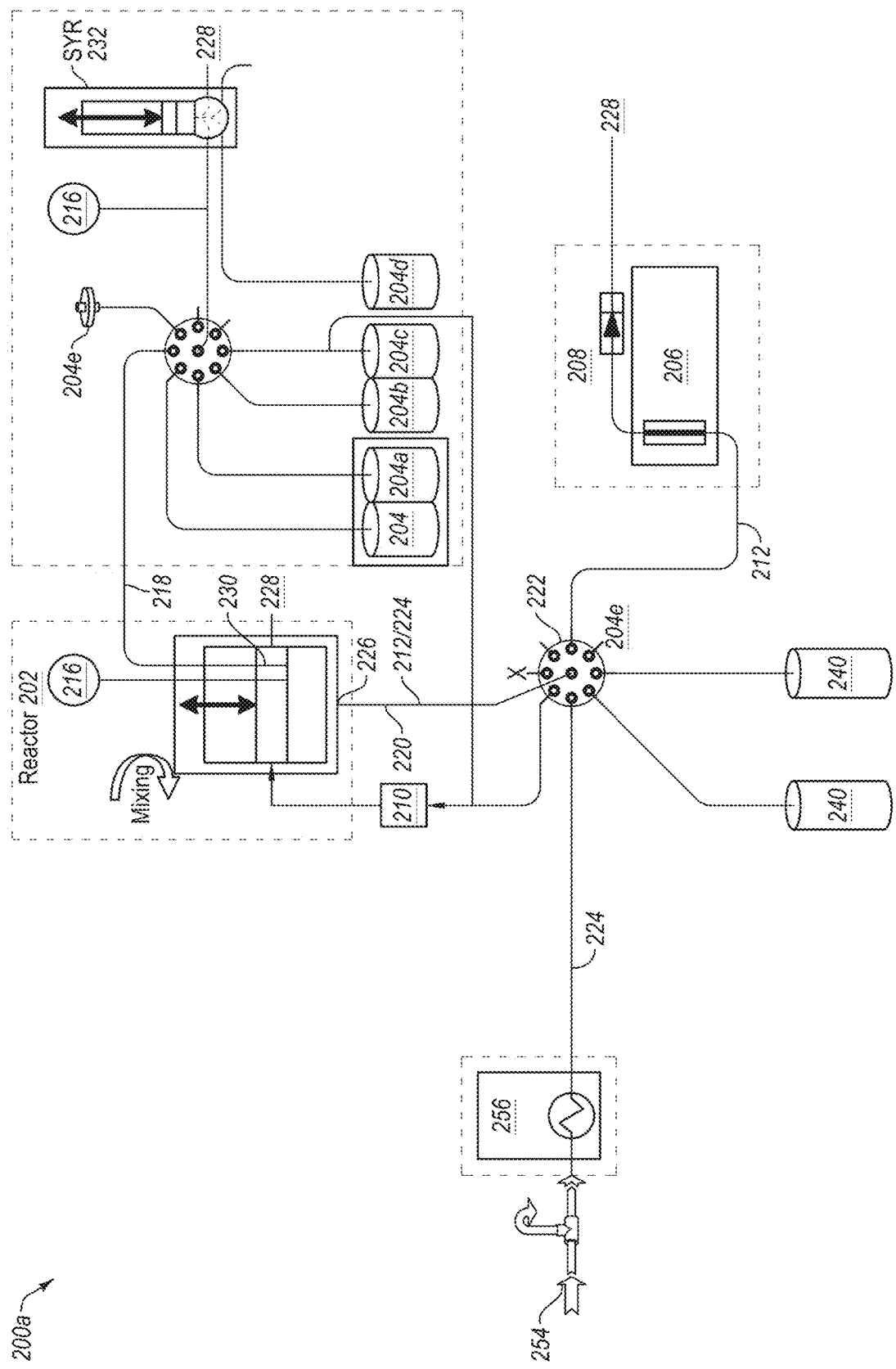
FIG. 2B shows an example of a full assay system that includes the flow cytometer of the embodiments described herein, a sample source, and a stained sample preparation system configured for an online system with a single staining reactor.

The system can be used for flow cytometry as described herein. The sample can be heated to 37° C. and the analyte stain is added, which can be with a buffer at about pH 7.5 or higher as may be required for optimal fluorescence from the utilized stain(s). The analyte stain is added at as low a concentration as possible to provide bioburden staining but minimize the generation of background fluorescence from the unbound dye(s). The reduction of concentration increases the clarity of the data signals to be analyzed and helps with the signal to noise ratio. The lower concentration provides less background photons, which helps with reducing confounding of the signal. The counterstain is also added and then the labeled sample is analyzed, which can be done in about 20 minutes. These dyes can be added manually or automatically from reservoirs that are shown in FIGS. 2A-2B. The reservoirs can be connected to the sample reservoir through conduits, which are not shown. A controller, such as a computer or computing system 600 as described herein, can be used to control the flow cytometer system functions from sample and dye mixing, to pumping with a pump (not shown) through the flow cell, to controlling the laser and collecting data from the detectors for the different signals. The controller can then be configured to analyze the data and discriminate target analyte (e.g., viable cells) from non-target analyte (e.g., nonviable cells) and other particles by counting fluorescent hits with no counterstain or counterstain less than a certain threshold, and omitting counting of fluorescent hits with a counterstain above the certain threshold. The controller can control all aspects of the operation, from temperature control, temperature measurement, flow control, etc, and data analysis.

During use, a human operator or automated operator can place a sample bottle having the sample onto the input of the flow cytometer. The controller can control the thermal management, timing management, introduction of dyes, pumping rates, and all fluidics, which can be fully automated. Additionally, the controller can control sanitization of the flow cell and sample reservoir between sample to sample so there is no sample carryover of reagents, buffers, or anything else from one sample to the next.

FIGS. 2A-2B show examples of full systems that includes the flow cytometer, identified as the analytics module therein. The full system shows the sample bottle autosampler, thermal sample control, reactors, reservoirs, pumps, valves, sample collectors, and other components.

The slow cytometry system 200 can include two reactors 202 as illustrated in FIG. 2A. In the first cycle, one reactor 202 is processed in the 20 minute incubation of sample 224 with the dyes (e.g., stain 204, counter stain 204a, 50 mL), and then the stained sample 212 is provided to the analytics module 206 (e.g., having flow cell) for interrogation, which takes about 20 minutes. This provides about 40 minutes to get an initial stained sample 212 processed by the flow cytometer 208. If there was only a single reactor 202, then there is a 40 minute turnaround for each stained sample 212. Now, however, with the second reactor 202, while one reactor 202 is pumping (not shown) the stained sample 212 to the analytics module 206, the second reactor 202 is cleaned, readied, and filled with another sample 224 with the stains 204 or counterstains 204a or buffer 204b (1L) or cleaner 204c (1L). Then, once the first stained sample 212 has been processed through the analytics module 206 (e.g., 20 minutes), the second stained sample 212 can immediately be processed through the analytics module 206. The allows for two stained samples 212 to be fully processed in 60 minutes for the first two samples. It is noted that the second stained sample 212 is done 20 minutes after the first stained sample 212 is done. However, there is only 40 total minutes for both the second stained sample 212 (20 minutes after first sample) and third stained sample 212 (20 minutes), and then for each next stained sample 112 in series is done after 20 minutes. However, a stained sample 212 is finished being processed every 20 minutes. This is a significant time saving especially when dealing with three or more samples 224 or a large number of samples (e.g., ten or more).

So, while one stained sample 212 is processing through the flow cytometer 208, the next sample 224 is in the other reactor 202 being stained with the stain 204 or counterstain 204a. This allows one analytics module 206 to be operated and supplied from two reactors 202 for maximum throughput from the automated system 200.

The reactor 202 includes a pressure transducer (PT) 216 to monitor for system health and reliable operations including lack of sample liquid, leaks or other functionality. The reagents can be input from top accessed lines 218, and the sample inlet and outlet is a bottom access line 220. The distribution valve 222 controls fluidic access to provide sample 224, cleaning solution (cleaner 204c), sanitizing solution, air 204e or other fluid to the reactor 202. The outlet 226 from the reactor 202 goes back to the distribution valve 222 to be routed to the appropriate place, such as the flow cytometer 208 for stained sample, or waste 228, cleaning solution 204c, sanitizing solution, sample collection 240 or the like.

The reactor 202 includes the movable piston 230 (e.g., see FIGS. 8A-8C) as a pump. The reactor 202 is configured for incubation and assay processing concurrent with a syringe pump functionality. The reactor 202 therefore functions as the pump. The reactor piston 230 movement aspirates the sample 224 in and pushes the stained sample 212 out. The pressure transducer 216 monitors the pressure to make sure operation is within parameters, and it can identify the presence of a clog, lack of fluid or other issue. This allows for the piston 230 in the reactor 202 to push the stained sample 212 to the flow cytometer 208. Accordingly, the reactor 202 has the dual function of reaction vessel and pump, which pulls sample 224 into the reactor 202 for being stained (e.g., stain 204, counter stain 204a) and push the stained sample 212 out and through the flow cell 104 of the flow cytometer 208.

In some embodiments, the automated system can be operated to perform the methods without using the piston reactor shown herein, wherein any type of reactor can be used that uses any type of pumping and conduit system to move liquids between reservoirs, the reactor, and the flow cytometer. As such, one or both reactors shown in FIG. 2A may be replaced with a different type of reactor (e.g., different reactor system), and any number or type of pump or valve or distributor can be used for moving the liquids, reagents, cleaner, samples, and stained samples through the system. In some aspects, one or more of the reactors is a fixed volume reactor. In some aspects, one or more reactors is a variable volume reactor. In some aspects, one or more pumps, such as a vacuum pump or fluid pump, can be used for moving liquids with respect to the reagent reservoirs, reactors, and flow cytometer, where any number of valves can be used to regulate flow. In some aspects, a vacuum pump can be used to fill a reactor with sample and/or stain, and then a fluid pump is used to flow the stained sample to the flow cytometer. The vacuum pump and fluid pump can be placed in any location to facilitate movement of the liquids.

In an example, a reactor can include a solid cap for the reaction chamber to provide a fixed volume, and a vacuum pump is connected to the piston/cap to facilitate filling the reaction chamber with the reagents, sample, or cleaner. Also, a fluid gear pump downstream of the flow cytometer 208 can be used to draw the stained sample through the fluid pathways to the flow cytometer 208. However, it should be recognized that other modifications to the system, such as type of equipment or placement thereof, may be employed under the teachings of the reactor system in order to arrive at the present invention.

The reactor 202 also includes a drive (not shown) for the piston, and a drive (not shown) for asymmetric mixing that shakes the reactor 202 to effect mixing of the reagents in the chamber of the reaction 202. The pully drive for the piston 230 can be used, and the other drive can be an asymmetric (cammed) to gravity to shake the reactor 202 for mixing.

The stain dyes 204 (counterstain 204a) can be provided under control of a metering system such as a syringe pump (SYR) 232 and a distribution valve 222. As such, the analyte stain 204, counterstain 204a, cleaner 204c, washing fluid (WFCC) 204d, and buffer 204b can be provided to the reactors 202, from the top line 218 in a top down injection through the piston 230 as shown to minimize sample contact with the dispensing fluidics.

Also, FIG. 1A shows the assay system 250 having an automated sample bottle distributor 252 configured to take samples 224, which can be passed to the inlet 254 of the system 200 through a thermal sample control 256, which sample 224 is then passed through a distribution valve 220 and routed to one of the reactors 202 for processing with stain 204 and/or counter stain 204a as described herein.

FIG. 2B shows an embodiment of the system 200a that omits automated sample bottle distributor 252 and only includes one reactor 202. This embodiment is an online version that samples from a fluid supply sequentially. Each stained sample 212 operation has a run time of about 40 minutes.

In one embodiment, the system can include the flow cytometer shown as the analytic module and a pump, whether manual or driven. The pump can then receive the stained sample to pump through the flow cell for analytical interrogation.

The system can include a barcode system to identify the sample bottle, which allows for chain of custody of each sample. The used sample bottles are ejected to a waste container (not shown).

While the system with automated sample bottle distributor 252 can be operated automated and unattended with sequential bottles being sampled, the STAT sampling access door in the autosampler can allow a user to expedite a specific sample by lifting the door and manually load a sample bottle ahead of the other sample bottles in the system.

The reactor 200 (e.g., RXTR) is configured for improved performance. The thermal sample control 256 is an implementation of a shell and tube heat exchanger that regulates the temperature of samples between 5° C. to 95° C. at up to 50 mL/min to be a correct 37° C. at the outlet 226, whether heating or cooling the sample 224. The line into the reactor 202 shows that the sample 224 and stains (204 204a) are at the temperature of operation, which is 37° C. (e.g., physiological temperature). The line 220 shows the path from the reactor 202 to the analytics module 206.

The system 202a can fill a sample 224 at up to 50 mL/min and get over 100 mL into the reactor 200 rapidly, the reactions can begin immediately with reagent additions as no thermal equilibration is required. The thermal sample control system 256 provides the benefit under control of the controller (e.g., 600) provides the sample to the reactor 202 at the appropriate temperature as required for the reagents and sample particles intended.

Figure 8C:
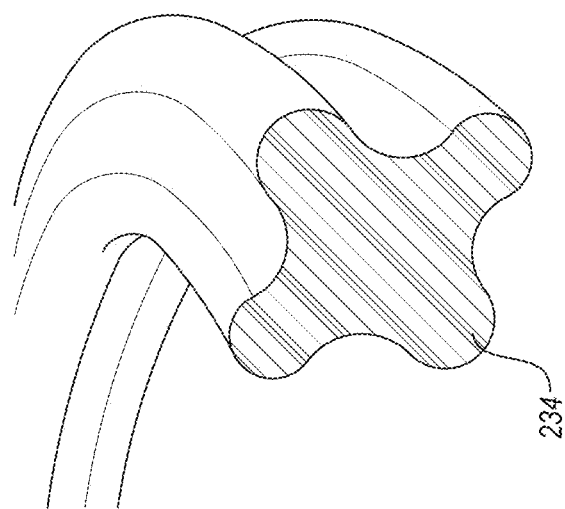
FIG. 8C shows seals of the piston.
Figure 8B:
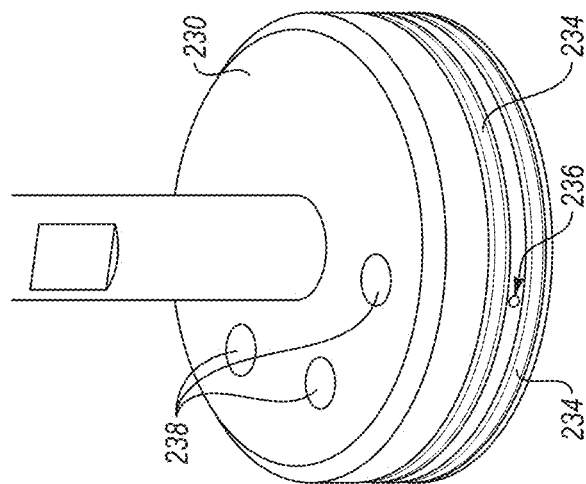
FIG. 8B shows a piston that operates with the reactor.
Figure 8A:
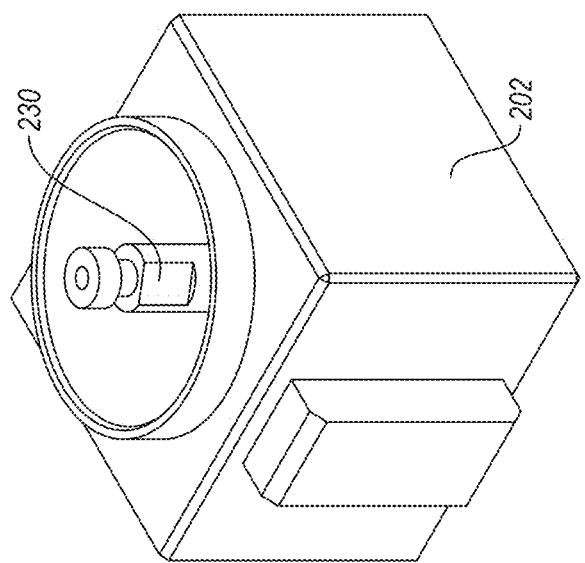
FIG. 8A shows a reactor for staining samples for the flow cytometer protocol.

The line 270 to and from the reactor shows the cleaning flow from cleaning fluid 204c to the piston 230 in the reactor 200. The piston 230, as shown in FIGS. 8A-8C, is configured with a double seal 234 design that allows for porting fluid through a port 236 between the seals 234 of the piston 230, such as cleaning fluid 204c, to clean and lubricate the seals 234, as shown in FIG. 8B. The port 236 between the two seals 234 provides for a cleaning fluid 204c or lubricant, or other liquid 240b to be passed between the two seals 234. The cleaning fluid 204c or sanitizing fluid can be passed to prevent contamination and buildup on the seals 234. It also cleans the microparticles that may form from the seals 234. The port 236 can be an inlet or outlet, and there is another port on the opposite side, which is the opposite of the first port. One port 236 is an inlet and one is an outlet. The piston head 230a includes the fluidic conduits 238 for providing reagent fluid (e.g., stain 204, counter stain 204a) to sample 222 in the reactor chamber.

The ability to fill the reactor 202 with a sample 224 that is already at reaction temperature to immediately react with the dyes in the stains 204, 204a that are also already at reaction temperature saves time during the protocol. The preconditioning the temperature of the sample may save up to 15-20 minutes of time from the entire protocol from start to finish.

The reactor can include a body that has a high polish surface finish for the entirety of the fluid contacted area. Accordingly, the ports provide lubricant to the seals to enhance the longevity of the seals. The lubricant also can eliminate contaminates from the reactor.

In some embodiments, a flow cytometer (100) can include at least one light emitter (120) configured to emit light in a light path. The flow cytometer (100) can include a rectangular flow cell (104) having flow cell width (W1) that is substantially lateral to the light path and a flow cell depth that is longitudinal to the light path. The light path has an interrogation width (W2) at the flow cell (104) that is narrower than the flow cell width (W1). A spherical reflector (106) is positioned adjacent to the rectangular flow cell (104) and has a concave reflective surface that has a reflective direction that is positioned substantially orthogonal with the light path such that reflected light is reflected along a reflected path that is substantially orthogonal with the light path. The illumination region 102 includes at least one light absorbing member (114) positioned at least partially around the reflected path to absorb reflected light at an angle to the reflected path. Each light absorbing member (114) includes at least one of: a tapered light absorbing surface (114a) that expands away from the flow cell (104); a parallel light absorbing surface (114b) that is substantially parallel with the reflected path; an orthogonal light absorbing surface (114c) that is substantially orthogonal with the reflected path; or a flow cell absorbing surface (104c) on a surface of a wall (104a) of the flow cell. Optionally, each light absorbing member (114) forms a light conduit with light absorbing internal walls.

The flow cytometer (100) can include a constrictor (108) defining an aperture (110) that is positioned such that the reflected path passes through the aperture (110). The aperture (110) can have a smaller cross-sectional dimension compared to a housing (e.g., constrictor, or other) from which the aperture defines an opening therein. In some aspects, the aperture (110) has a dimension less than 50 mm, less than 25 mm, or less than 15 mm.

The flow cytometer (100) can include at least one light absorbing member (114) positioned between the flow cell (104) and the aperture (110) so as to define a light conduit therebetween. In some aspects, at least one light absorbing member (114) at least partially defines the aperture (110).

In some embodiments, a main conduit (142) is downstream from the aperture (110), wherein downstream references the reflected light path passing through the aperture into the main conduit. The main conduit (142) can include at least one light absorbing member (114) covering at least part of an internal surface of the main conduit (142).

In some embodiments, a beam splitter (136) is located in the main conduit (142). A light absorbing member (14) is posited between the aperture (110) and the beam splitter (136) so as to define a light conduit therebetween.

The flow cytometer (100) can include a first collection channel (130) positioned to receive light reflected from the beam splitter (136) and a second collection channel (132) positioned to receive light that passes through the beam splitter (136). At least one of the first collection channel (130) or second collection channel (132) includes a notch filter (137). In some aspects, at least one light absorbing member (133/139) in at least one of the first collection channel (130) and second collection channel (132).

The flow cytometer (100) can include a collection lens (116) adjacent to the flow cell (104) such that the flow cell is between the spherical reflector (106) and the collection lens. The spherical reflector (106) can be a back reflector, and the flow cytometer (100) is devoid of a front reflector where the absorber (114) replaces any front reflector.

In some embodiments, the flow cytometer (100) can include or be included in a system (200, 200a) that includes various components. The components can include a sample reservoir or sample collection system (250), which provides the sample (224) for staining (204, 204a). The components can include an analyte stain reservoir (204) comprising an analyte stain composition, wherein the analyte stain composition includes a dye configured to detect a target analyte. The components can include a counterstain reservoir (204a) comprising a counterstain composition, wherein the counterstain composition includes a dye configured to detect a non-target analyte.

The flow cytometer (100/208) or system (200, 200a) can include at least one pump (110) operably coupled with the sample reservoir (e.g., line 220 feeding sample 224 can be a sample reservoir, the samples in the automated sample bottle distributer 252 may also be reservoirs), analyte stain reservoir (204), and counterstain reservoir (204a) and with the flow cell (104) in the analytic module 206 of the flow cytometer (100/208). Each pump (110) is configured for a flow rate of at least 1 mL/min, 5 mL/min, 20 mL/min, 50 mL/min, or 100 mL/min.

In some embodiments, the flow cytometer (100/208) is devoid of at least one of the following: a sheath flow reservoir and/or sheath flow pump, such that no sheath flow occurs in the flow cell; or a particle sizing system.

In some embodiments, a kit can include the flow cytometer (100/208) of one of the embodiments. The kit can also include an analyte stain (204) having a first fluorescence wavelength. The kit can also include a counterstain (204a) having a second fluorescence wavelength.

In some embodiments, a method of detecting a target analyte in a sample is provided, which can be performed under the operation of a controller (e.g., computing device 600, computing system, etc.). The target analyte detection method can be performed with the flow cytometer (100/208) of one of the embodiments. A sample having an analyte stain and a counterstain can be provided to the flow cytometer (100/208). The analyte stain emission wavelength is distinguishable from a counterstain emission wavelength, which can be detected, and processed by the controller. The controller can analyze the sample by using light interrogation of the stained sample with the flow cytometer (100/208). The controller can analyze sample data from the flow cytometer (100/208) for the stained sample, and detect a potential target having the analyte stain. The controller, which can also be a data analysis computer, can be used for determining the potential target to be devoid of the counterstain or have the counterstain below a counterstain threshold. The controller can then be used for identifying the detected potential target having the analyte stain without the counterstain or having the counterstain below the counterstain threshold as the target analyte. However, the controller and data analysis computer can be separate computer devices (600). The controller can be in operable communication with any component in the system to control operation of that component, receive data, and optionally modify operation of any component.

In some embodiments, the flow cytometer has a lower detection limit of about 1 analyte per 100 mL, which can range from 1 analyte per 50 mL to 150 mL, per 75 mL to 125 mL, or 90 mL to 120 mL. This objected lower detection limit can be obtained with the light absorbing features in the flow cytometer. The method can include passing the sample through the flow cell at a flow rate of at least 1 mL/min, 5 mL/min, 20 mL/min, 50 mL/min, or 100 mL/min, which may also attribute to the lower detection limit.

In some embodiments, the analyte stain is specific for staining a nucleic acid and the counterstain is capable of permeating an unviable cell. In some aspects, the sample is selected from a food sample, beverage sample, environmental sample, or a purified water sample. In some aspects, the method includes blocking a range of wavelengths of light emission from the analyte stain or counterstain, such as with a filter or splitter.

In some embodiments, the method can include defining a counterstain percentage threshold. Then, the method can include determining whether the emission of the counterstain that is below the counterstain percentage threshold. When the emission of the counterstain is below the counterstain percentage threshold, the analyte is present or cell is determined to be viable. When the emission of the counterstain is above the counterstain percentage threshold, the analyte is not present or cell is determined to be unviable.

In some embodiments, the method can include defining an analyte stain to counterstain ratio threshold. Then, the method can include determining whether the emission of the analyte stain and emission of the counterstain have an analyte stain to counterstain ratio that is above the analyte stain to counterstain ratio threshold. When the ratio is above the analyte stain to counterstain ratio threshold, the analyte is present or the cell is determined to be viable. When the ratio is below the analyte stain to counterstain ratio threshold, the analyte is not present or the cell is determined to be unviable.

In some embodiments, the method can include defining a counterstain to analyte stain ratio threshold. Then, the method can include determining whether the emission of the counterstain and emission of the analyte stain have a counterstain to analyte stain ratio that is below the counterstain to analyte stain ratio threshold. When the ratio is below the counterstain to analyte stain ratio threshold, the analyte is determined to be present or the cell to be viable. When the ratio is above the counterstain to analyte stain ratio threshold, the analyte is not present or the cell is determined to be unviable.

In some embodiments, the method can include inhibiting internal reflectance of light with the at least one light absorbing member. The inhibition of reflectance can be done with any one or more or all of the light absorbing members in the flow cytometer.

In some embodiments, the method can include emitting at least one interrogation light beam into the rectangular flow cell with the at least one light emitter such that the light path of the interrogation light beam has an interrogation width at the flow cell that is narrower than the flow cell width. The redirected light from a back wall of the flow cell travels toward the spherical reflector and is reflected back through the flow cell and out a front wall of the flow cell on the reflected path.

In some embodiments, the method can include light that is between the flow cell front wall and exit aperture at an angle relative to the reflected path being absorbed with at least one light absorbing member. In some aspects, reflected light at an angle relative to the reflected path is absorbed with at least one light absorbing member. In some aspects, light is not reflected into the exit aperture or along the reflected path upon contacting at least one light absorbing member. In some aspects, light does not pass through a light absorbing member on the flow cell wall. In some aspects, a light conduit absorbs light at an angle with the reflected path with at least one light absorbing member.

In some embodiments, the exit aperture through which the light path extends to allow light out of the illumination region, is light aperture defined by the constrictor. As such, the exit aperture can be from a housing from which the aperture defines an opening therein. The light on the reflected path passes through the exit aperture into a main conduit. In some aspects, light between the exit aperture and a beam splitter in the main conduit that is at an angle relative to the reflected path is absorbed with at least one light absorbing member. Reflected light in the main conduit that is at an angle relative to the reflected path is absorbed with at least one light absorbing member in the main conduit. Light is not reflected into the beam splitter or along the reflected path upon contacting at least one light absorbing member in the main conduit. The light conduit in the main conduit absorbs light that is at an angle with the reflected path with at least one light absorbing member in the main conduit.

In some embodiments, the one or more beam splitters can be used to split the reflected light into two or more collection channels. Light reflected from the beam splitter to be directed into the first collection channel that is at an angle relative to a beam splitter reflected path is absorbed with at least one light absorbing member in the first collection channel Reflected light in the in the first collection channel that is at an angle relative to the beam splitter reflected path is absorbed with at least one light absorbing member in the first collection channel. Light is not reflected into an optical element in the first collection channel or along the beam splitter reflected path upon contacting at least one light absorbing member in the first collection channel A light conduit in the first collection channel absorbs light that is at an angle with the beam splitter reflected path with at least one light absorbing member in the first collection channel. Light passed through the beam splitter to be directed into the second collection channel along the reflected path that is at an angle relative to the reflected path is absorbed with at least one light absorbing member in the second collection channel Reflected light in the in the second collection channel that is at an angle relative to the reflected path is absorbed with the at least one light absorbing member in the second collection channel Light is not reflected into an optical element in the second collection channel or along the reflected path upon contacting at least one light absorbing member in the second collection channel A light conduit in the second collection channel absorbs light that is at an angle with the reflected path with at least one light absorbing member in the second collection channel.

In some embodiments, a collection lens directs light along the reflected path.

In some embodiments, the method can include obtaining a sample from a sample reservoir, sample bottle, sample input or other sample source. An analyte stain can be obtained from an analyte stain reservoir comprising an analyte stain composition, wherein the analyte stain composition includes a dye. A counterstain can be obtained from a counterstain reservoir comprising a counterstain composition, wherein the counterstain composition includes a dye. The sample can be stained with the analyte stain and/or counterstain in a reactor. The stained sample can be provided to the flow cell for light interrogation. The stained sample can be flowed through the flow cell at a flow rate of at least 1 mL/min, 5 mL/min, 20 mL/min, 50 mL/min, or 100 mL/min.

In some embodiments, a data analysis computer (e.g., controller) can be configured for analyzing data from the flow cytometer in order to identify the presence of a target analyte. The data analysis computer can be configured for performing a match filter analysis on the analyte stain data peaks to determine peaks that are candidates to be target analyte. The match filter analysis includes: Walk the raw data applying match filter to isolate the shape matched information; Apply threshold logic to identified 'peaks'; If a peak is above detection threshold for specified min/max number of records, then peak identified; Get peak raw signal intensities for both channels (analyte stain and counterstain); Get number of records above threshold; Get peak intensity for both channels; Apply discrimination logic for at least 2 channels; analyte stain channel is determined whether within min/max intensity range (Ch1 FLF1); counterstain channel is determined whether within min/max intensity range (Ch2 FLF1); Ratio of analyte stain channel intensity to counterstain channel intensity is determined (Ch2 FLF2).

In some embodiments, potential target analytes are then selected based on the match filtering. For example, the peak must be within: detection threshold range; analyte stain channel is within range; counterstain channel is within range; and/or ratio of analyte stain channel intensity to counterstain channel is within range.

In some embodiments, the flow cytometer or system for providing the stained sample can be configured as described herein. The system can have two reactors for staining two separate samples, and both reactors provide input into the single flow cytometer. The system is configured such that: the first sample is heated and stained in a first reactor; the first sample is passed from the first reactor through the flow cytometer; while the first sample is being passed through the flow cytometer, the second reactor is staining the second sample that was preconditioned; after the first sample is completely passed through the flow cytometer, the second sample is passed from the second reactor through flow cytometer; while the second sample is being passed through the flow cytometer, the first reactor is staining a third sample that was preconditioned; and the method continues by alternating the first reactor and second reactor in staining steps and pumping to the flow cytometer steps.

The methods described herein that are performed with the flow cytometer or with the system for providing the stained sample can be under the control of a controller. The controller can include a non-transient memory having computer-executable instructions for performing the method steps described herein. The data analysis methods can be performed with a data analysis computer, which can be the same or different computing system from the controller.

EXAMPLES

An experiment can include analysis of a single 100 mL sample that has a target maximum of 5 bacterial cells. The analysis of the 100 mL is conducted over a 20 minute run, where data collection included 6.25 million records, where each record there is a noise band or there is a signal. In an example, a particle is detected by the flow cytometer and it was 3 records long with the noise.

The data can be picked up as raw data and analytics are used to find and validate the signals that are viable cells and determine the signals to ignore. The protocol can include running a match filter on the data to obtain identifications of data peaks that match known viable particle data peaks. The match filter can be a shape analysis that identifies data peak shapes that correspond with known data peak shapes of identifiable bacteria, other microbes, or other target analytes (e.g. labeled viruses, active ingredients, nonbiological contaminants, etc.). The analyte stain data signal is used for the match filter. Once the analyte data signal peaks are identified as possible viable cells, then further analysis can be conducted. Machine learning can be used to learn analyte peaks versus non-target peaks, and then used to select the analyte peaks from the data.

The protocol can include a shape finding operation with the match filter such that matches have different criteria for how big each record hit is, the minimum number of hits, or the shape of each record hit. The data can be analyzed to have a minimum amplitude above a baseline so if a peak is too small, the system determines the peak is not a viable cell. The analysis can also have a maximum amplitude that can be used to disqualify peaks that are too big. If a peak is too big, it may indicate the peak is a piece of something that came off of a gasket that is too large to be the target bioburden, and then it gets disqualified as a viable cell. Also, if the emitted fluorescent signal saturates the PMTs it indicates that the PMTs went blind for a microsecond, which can disqualify the peak from being a viable cell. These parameters are used for determining which peaks qualify for further analysis.

In an example, the system found 43 valid hits (signals) and 397 other signals that were too short, had insufficient intensity and/or area or otherwise disqualified as being a viable cell. There were 440 total signals determined to be particle events in the cell stain channel, but only 43 were valid as viable particles. The comparison of each cell stain peak with the corresponding counterstain peak provides the indication of whether the signal is for a viable cell, such as when the percent of the total peak of the counterstain signal is below a threshold.

In an example, a signal peak height can be 150 record units, where the discriminator is set at 100 units, which allows the peak to be possibly a viable cell. The signal peak width can have a minimum threshold to use to determine peaks that are not viable cells so the corresponding peaks can be disqualified.

The selected 43 valid hits can then be analyzed to determine which hits are viable cells or not (e.g., biotic or abiotic). The FLF1 channel can be for size discrimination. The FLF2 channel is a ratio of that spectral signal channel versus other channels, where for example channel 1 is a reference channel and channel 2 is the counter channel. The factors can be weighted by different factors, such as equally weighted. However, the weighting can be at 200% for the counterstain channel (red) versus the analyte stain channel (green). The FLF1 and FLF2 channel parameters can be varied as desired.

The baseline of the signals can be dynamic so that the data can be tracked because the baseline moves depending on the run with the dyes and the interaction with the system. So, using a dynamic baseline can facilitate optimal data analysis sensitivity. The dynamic baseline can be obtained by a distribution of baselines over a period of time, and selecting the statistically significant portion of the distribution to be the baseline for any particular analysis or comparison.

Figure 3:
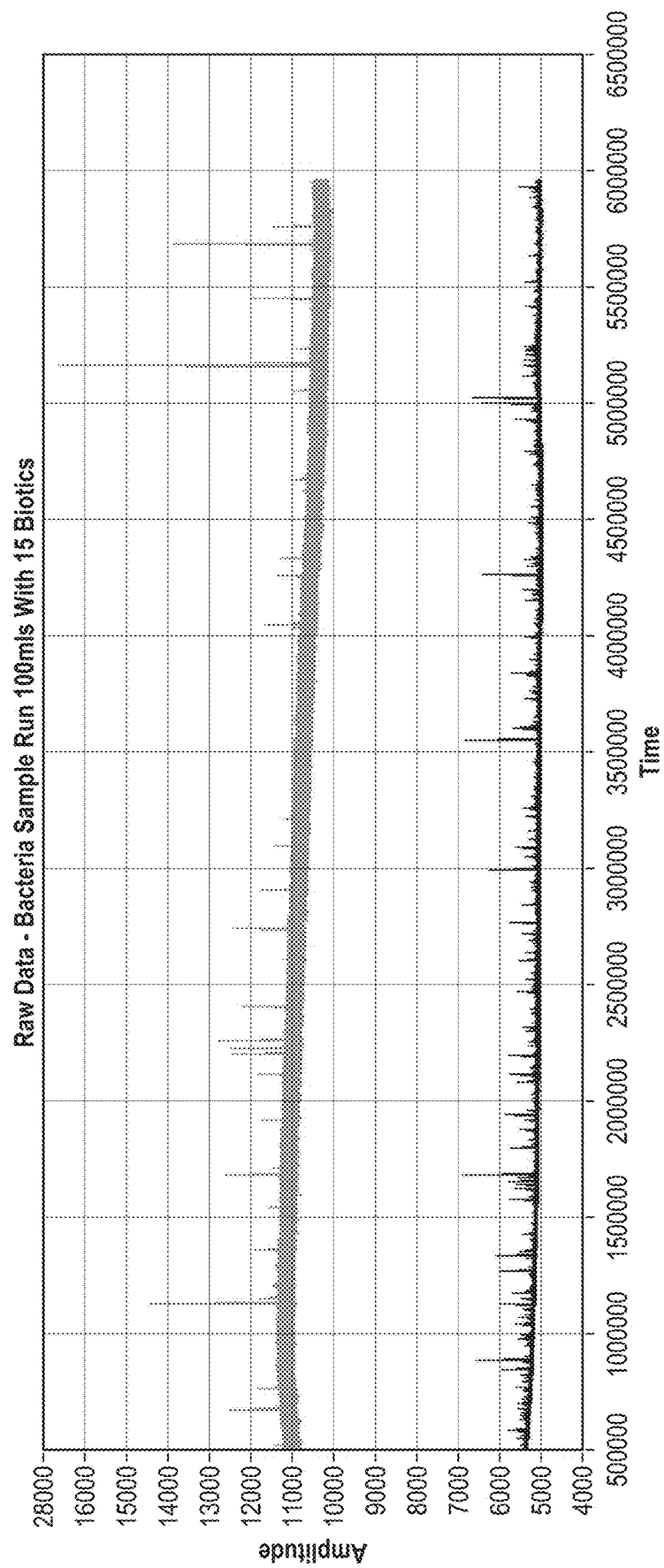
FIG. 3 includes data that shows that a green channel can be used for the analyte stain and the red channel can be used for the counterstain.

The green channel can be used for the analyte stain and the red channel can be used for the counterstain, as shown in FIG. 3. In the application with the analyte stain dye the analysis looks for the live cells; however, the system could also use two or more analyte stains for two or more channels. Also, the system can be employed to look for just the red cells (e.g., counterstain). Additionally, the system can use a combination of signals and add them together. The data of FIG. 3 shows the bacteria sample run with 100 mL with 15 biotics, where the top data points are for the green stain and the bottom data points are for the red stain (e.g., counter stain).

Figure 4:
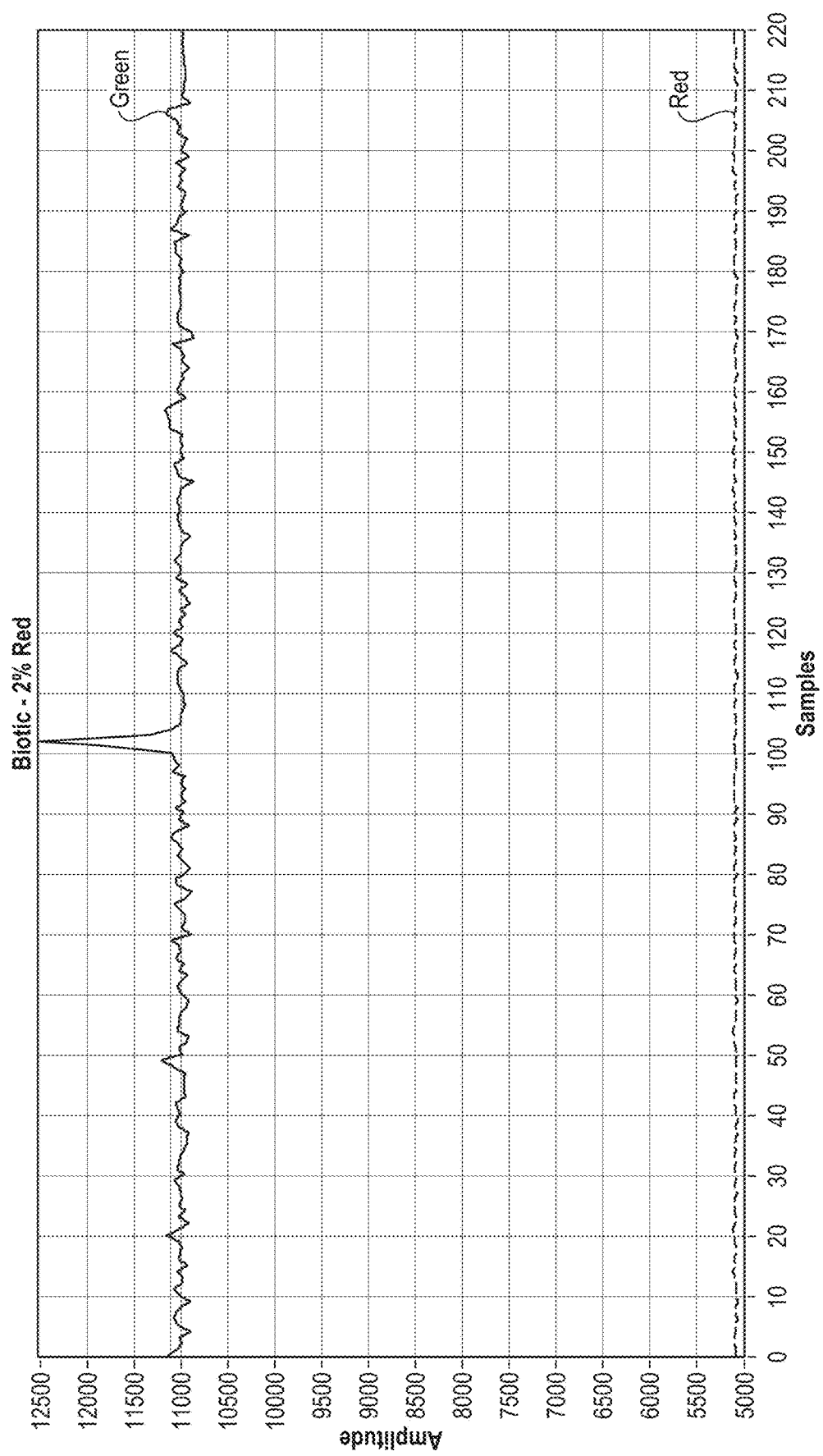
FIG. 4 includes data that shows an example of a signal that is a biotic as indicated by having a target analyte stain signal and peak within size and amplitude parameters within tolerances.

FIG. 4 shows an example of a signal that is a biotic as indicated by having a target analyte stain signal and peak within size and amplitude parameters within tolerances determined to be suitable spectral profiles for the target analyte and counterstain size. The peak intensities are below the maximum tolerances determined suitable in correlation with the target analyte stain size and peak intensities determined suitable spectral profiles for discrimination of a viable target analyte (e.g., a viable cell). FIG. 4 shows biotic with 2% red.

Figure 5:
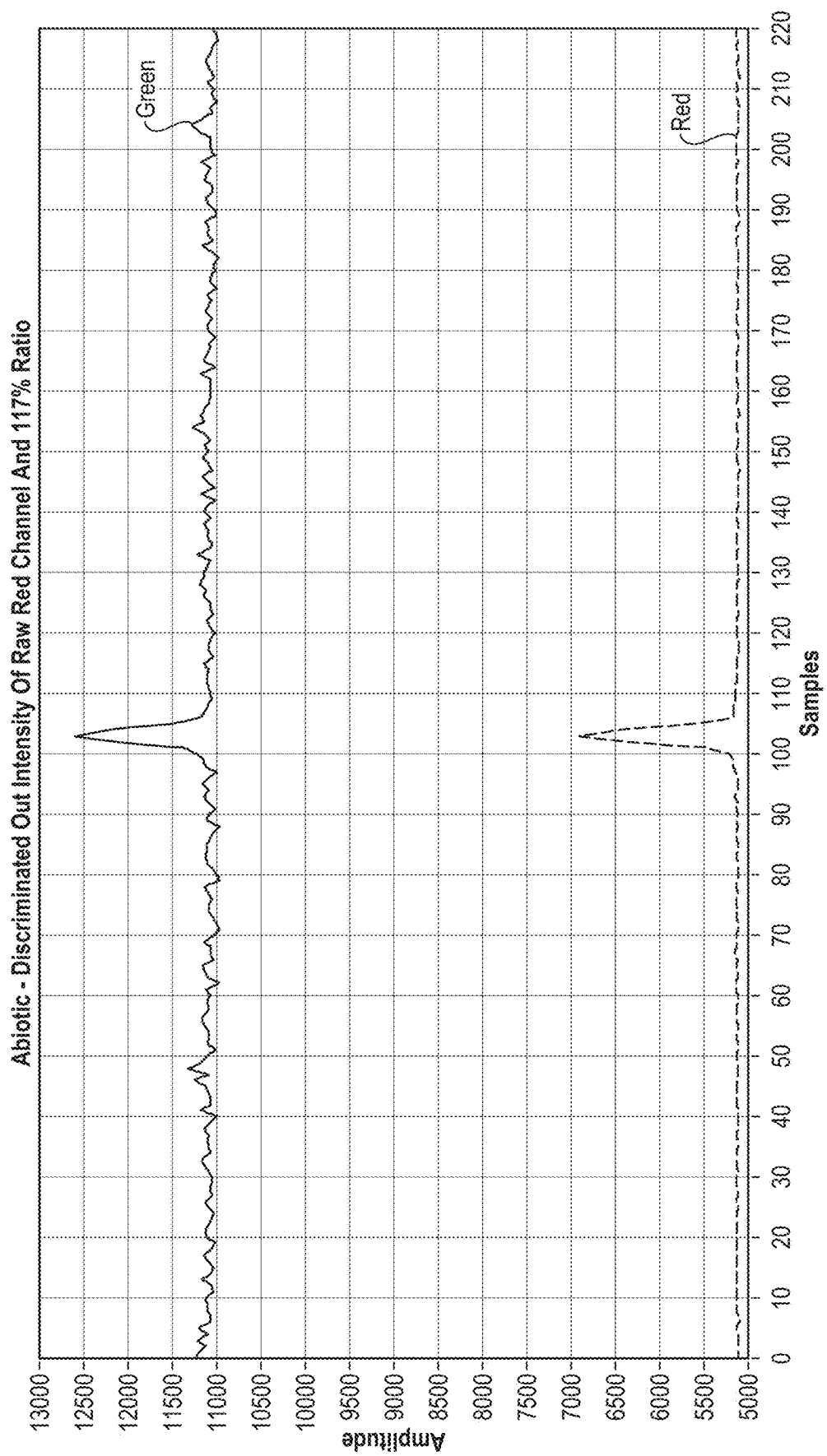
FIG. 5 includes data that shows an example of a signal that is not a viable target analyte (e.g., abiotic particle).

FIG. 5 shows an example of a signal that is not a viable target analyte (e.g., abiotic particle) due to the counterstain peak (e.g., red) being above the maximum tolerances determined suitable in correlation with the target analyte stain size and peak intensities determined suitable spectral profiles for discrimination of a viable target analyte (e.g., a viable cell). FIG. 5 shows that the abiotic was discriminated out due to the intensity of the red channel and the ratio being 117%, which is not a live bacteria.

Figure 6:
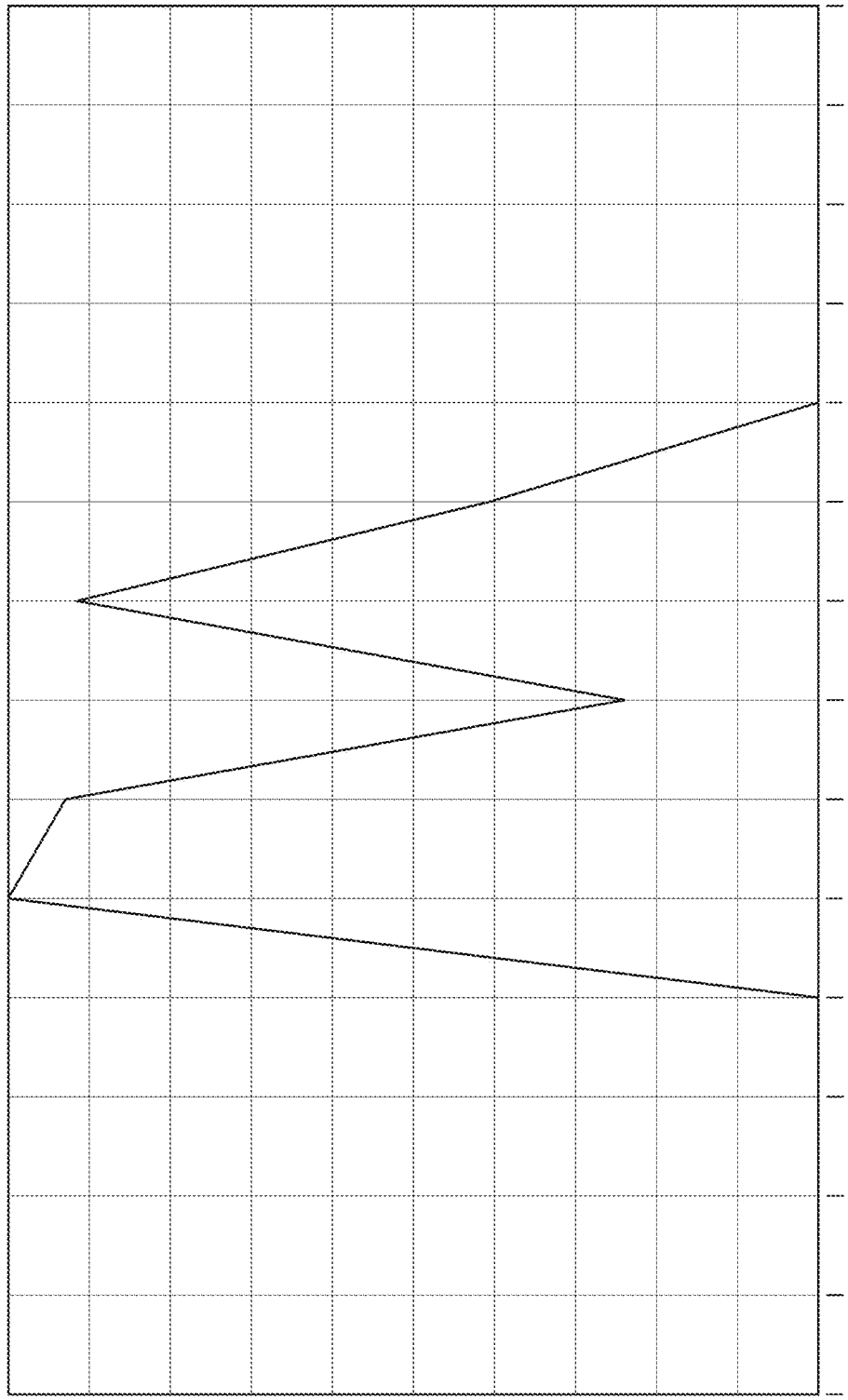
FIG. 6 shows a graph from a match filter example.

FIG. 6 shows a graph of a match filter example. The match filter method can be performed as follows:
1) Walk the raw data applying match filter to isolate the shape matched information.
2) Apply threshold logic to identified 'peaks'.
   a) If peak is above detection threshold for specified min/max number of records, then the peak identified.
3) Get peak raw signal intensities for both channels (analyte stain and counterstain),
   a) Get number of records above threshold.
   b) Get peak intensity both channels.
4) Apply discrimination logic (2 channel example).
   a) Biotic channel is determined whether within min/max intensity range (Ch1 FLF1).
   b) Abiotic channel is determined whether within min/max intensity range (Ch2 FLF1).
   c) Ratio of Biotic channel intensity to Abiotic channel is determined (Ch2 FLF2).
5) Potential viable particles are then selected based on the match filtering, where the peak must be within:
   a) detection threshold range;
   b) biotic channel is within range;
   c) abiotic channel is within range; and/or
   d) ratio of biotic channel intensity to abiotic channel is within range.

In some embodiments, the data and analysis parameters described herein as well as the outcome determinations for target analytes being viable cells or not can be used as input data to train an artificial intelligence system. The data can be input and processed through encoder or other neural network to generate latent data that can then be decoded into output data. The output data can be the generated predicted determination of whether particles are viable cells. Then, the trained artificial intelligence system can be used to determine which data identifies viable cells and which data does not indicate a viable cell. This allows for the trained artificial intelligence system to perform data analysis and determine which particles are viable based on training data and outcomes from real data. Thus, the methods of discriminating viable cells from other particles can be performed as described herein and applied to artificial intelligence systems.

One skilled in the art will appreciate that, for the processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In one embodiment, the present methods can include aspects performed on a computing system. As such, the computing system can include a memory device that has the computer-executable instructions for performing the methods. The computer-executable instructions can be part of a computer program product that includes one or more algorithms for performing any of the methods of any of the claims.

In one embodiment, any of the operations, processes, or methods, described herein can be performed or cause to be performed in response to execution of computer-readable instructions stored on a computer-readable medium and executable by one or more processors. The computer-readable instructions can be executed by a processor of a wide range of computing systems from desktop computing systems, portable computing systems, tablet computing systems, hand-held computing systems, as well as network elements, and/or any other computing device. The computer readable medium is not transitory. The computer readable medium is a physical medium having the computer-readable instructions stored therein so as to be physically readable from the physical medium by the computer/processor.

There are various vehicles by which processes and/or systems and/or other technologies described herein can be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The various operations described herein can be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware are possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a physical signal bearing medium include, but are not limited to, the following: a recordable type medium such as a floppy disk, a hard disk drive (HDD), a compact disc (CD), a digital versatile disc (DVD), a digital tape, a computer memory, or any other physical medium that is not transitory or a transmission. Examples of physical media having computer-readable instructions omit transitory or transmission type media such as a digital and/or an analog communication medium (e.g., a fiber optic cable, a waveguide, a wired communication link, a wireless communication link, etc.).

It is common to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems, including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. Such depicted architectures are merely exemplary, and that in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include, but are not limited to: physically mateable and/or physically interacting components and/or wirelessly interactable and/or wirelessly interacting components and/or logically interacting and/or logically interactable components.

Figure 7:
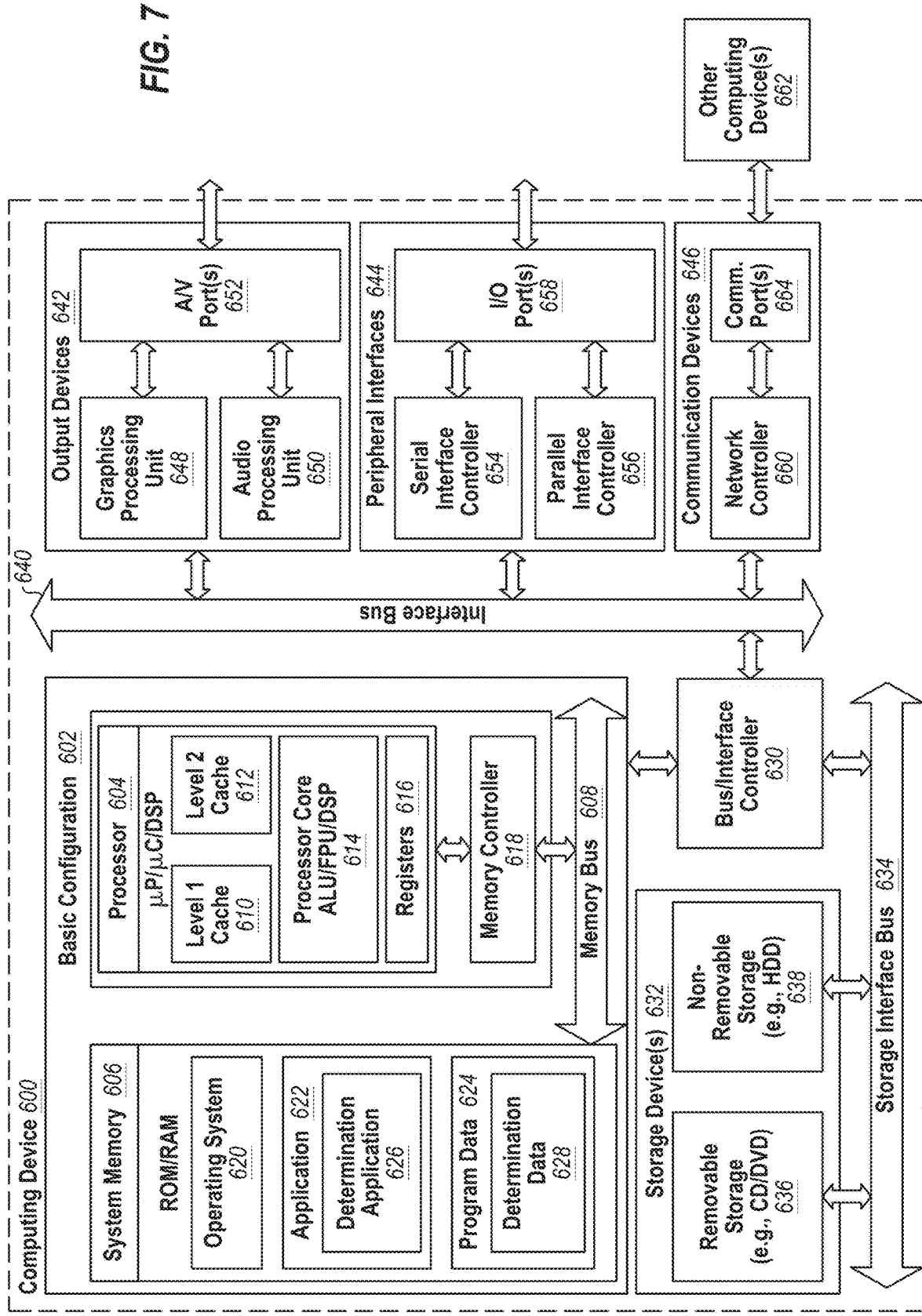
FIG. 7 shows an example computing device (e.g., a computer) that may be arranged in some embodiments to perform the methods (or portions thereof) described herein.

FIG. 7 shows an example computing device 600 (e.g., a computer) that may be arranged in some embodiments to perform the methods (or portions thereof) described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including, but not limited to: a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations, memory controller 618 may be an internal part of processor 604.

Depending on the desired configuration, system memory 606 may be of any type including, but not limited to: volatile memory (such as RAM), non-volatile memory (such as ROM, flash memory, etc.), or any combination thereof. System memory 606 may include an operating system 620, one or more applications 622, and program data 624. Application 622 may include a determination application 626 that is arranged to perform the operations as described herein, including those described with respect to methods described herein. The determination application 626 can obtain data, such as pressure, flow rate, and/or temperature, and then determine a change to the system to change the pressure, flow rate, and/or temperature.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include: magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include: volatile and non-volatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to: RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In some embodiments, a computer program product can include a non-transient, tangible memory device having computer-executable instructions that when executed by a processor, cause performance of a method that can include: providing a dataset having object data for an object and condition data for a condition; processing the object data of the dataset to obtain latent object data and latent object-condition data with an object encoder; processing the condition data of the dataset to obtain latent condition data and latent condition-object data with a condition encoder; processing the latent object data and the latent object-condition data to obtain generated object data with an object decoder; processing the latent condition data and latent condition-object data to obtain generated condition data with a condition decoder; comparing the latent object-condition data to the latent-condition data to determine a difference; processing the latent object data and latent condition data and one of the latent object-condition data or latent condition-object data with a discriminator to obtain a discriminator value; selecting a selected object from the generated object data based on the generated object data, generated condition data, and the difference between the latent object-condition data and latent condition-object data; and providing the selected object in a report with a recommendation for validation of a physical form of the object. The non-transient, tangible memory device may also have other executable instructions for any of the methods or method steps described herein. Also, the instructions may be instructions to perform a non-computing task, such as synthesis of a molecule and or an experimental protocol for validating the molecule. Other executable instructions may also be provided.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety: U.S. Pat. Nos. 4,745,285; 6,184,990; and U.S. 2017/0038299.

The invention claimed is:

1. A flow cytometer comprising:
at least one light emitter configured to emit light in a light path;
a rectangular flow cell having a flow cell width that is substantially lateral to the light path and a flow cell depth that is longitudinal to the light path, wherein the light path has an interrogation width at the flow cell that is narrower than the flow cell width;
a spherical reflector positioned adjacent to the rectangular flow cell and having a concave reflective surface that has a reflective direction that is positioned substantially orthogonal with the light path such that reflected light is reflected along a reflected path that is substantially orthogonal with the light path,
wherein a stained sample having an analyte stain and a counterstain is provided, where the analyte stain has an analyte stain signal that is distinguishable from a counterstain signal of the counterstain, and wherein the stained sample is interrogated with light in the flow cell of the flow cytometer; and one or more processors in communication with a memory, said memory storing computer executable instructions that cause the one or more processors to perform operations, the operations comprising:

detecting a potential target is detected, wherein the potential target is detected by detecting a presence of the analyte stain signal from the stained sample in the flow cell;

identifying the detected potential target as a target analyte if the potential target has the analyte stain signal without the counterstain signal, or has the analyte stain signal and has the counterstain signal below the counterstain threshold; and determining the target analyte to be viable if the analyte stain signal is present and the counterstain signal is below the counterstain threshold, or determining the detected target analyte to not be viable if the counterstain signal is above the counterstain threshold, wherein the target analyte comprises a moiety like a cell.

2. The flow cytometer of claim 1, further comprising at least one of:
at least one light absorbing member positioned at least partially around the reflected path to absorb reflected light that is at an angle to the reflected path;
at least one light absorbing member positioned between the flow cell and an exit aperture so as to define a light conduit therebetween; or
at least one light absorbing member at least partially defines an exit aperture.

3. The flow cytometer of claim 2, wherein the at least one light absorbing member includes at least one of:
a tapered light absorbing surface that expands away from the flow cell;
a parallel light absorbing surface that is substantially parallel with the reflected path; an orthogonal light absorbing surface that is substantially orthogonal with the reflected path; or
on a surface of a wall of the flow cell.

4. The flow cytometer of claim 1, further comprising a constrictor defining an exit aperture that is positioned such that the reflected path passes through the exit aperture, wherein the exit aperture has a smaller cross-sectional dimension compared to a housing from which the exit aperture defines an opening therein.

5. The flow cytometer of claim 1, further comprising a main conduit downstream from an exit aperture opposite of the flow cell, wherein the main conduit includes at least one main conduit light absorbing member covering at least part of an internal surface of the main conduit.

6. The flow cytometer of claim 5, further comprising a beam splitter in the main conduit, wherein at least one light absorbing member is posited between the exit aperture and the beam splitter so as to define a light conduit therebetween.

7. The flow cytometer of claim 6, further comprising a first collection channel positioned to receive light reflected from the beam splitter and a second collection channel positioned to receive light that passes through the beam splitter, wherein at least one of the first collection channel and second collection channel includes a notch filter.

8. The flow cytometer of claim 7, further comprising at least one light collection channel absorbing member in at least one of the first collection channel or second collection channel.

9. A flow cytometry system comprising: the flow cytometer of claim 1:
a sample source;
an analyte stain reservoir comprising an analyte stain composition having the analyte stain signal, wherein the analyte stain composition includes a dye configured to detect the target analyte; and
a counterstain reservoir comprising a counterstain composition having the counterstain signal, wherein the counterstain composition includes a dye configured to detect a non-target analyte.

10. A kit comprising: the flow cytometer of claim 1; wherein the analyte stain signal comprises a first fluorescence wavelength; and the counterstain signal comprises a second fluorescence wavelength.

11. A method of detecting a target analyte in a sample, the method comprising:
providing a stained sample having an analyte stain and a counterstain, where the analyte stain has an analyte stain signal that is distinguishable from a counterstain signal from the counterstain;
interrogating the stained sample with light in a flow cell of a flow cytometer, wherein the flow cytometer comprises:
at least one light emitter configured to emit light in a light path,
wherein the flow cell comprises a rectangular flow cell having a flow cell width that is substantially lateral to the light path and a flow cell depth that is longitudinal to the light path, wherein the light path has an interrogation width at the flow cell that is narrower than the flow cell width; and
a spherical reflector positioned adjacent to the rectangular flow cell and having a concave reflective surface that has a reflective direction that is positioned substantially orthogonal with the light path such that reflected light is reflected along a reflected path that is substantially orthogonal with the light path;
detecting a potential target, wherein the potential target is detected by detecting a presence of the analyte stain signal from the stained sample in the flow cell;
determining whether the potential target is devoid of the counterstain signal or whether the potential target has the counterstain signal below a counterstain threshold, wherein the counterstain threshold is determined as a ratio of the analyte stain signal to the counterstain signal;
wherein the detected potential target is identified as a target analyte if the potential target has the analyte stain signal without the counterstain signal, or has the analyte stain signal and has the counterstain signal below the counterstain threshold; and
determining that the target analyte is viable if the analyte stain signal is present and the counterstain signal is below the counterstain threshold, or determining that the target analyte is not viable if the counterstain signal is above the counterstain threshold, wherein the detected target analyte comprises a moiety like a cell.

12. The method of claim 11, further comprising performing a detection protocol, wherein the detection protocol includes a lower detection limit of about 1 analyte/100 mL.

13. The method of claim 11, further comprising passing the stained sample through the flow cell at a flow rate of at least 1 mL/min, 5 mL/min, 20 mL/min, 50 mL/min, or 100 mL/min.

14. The method of claim 11, further comprising inhibiting internal reflectance of light in the flow cytometer with at least one light absorbing member, wherein the light absorbing member comprises at least one of: a tapered light absorbing surface that expands away from the flow cell; a parallel light absorbing surface that is substantially parallel with the reflected path; an orthogonal light absorbing surface that is substantially orthogonal with the reflected path; a flow cell absorbing surface on a surface of a wall of the flow cell; or wherein each light absorbing member forms a light conduit with light absorbing internal walls.

15. The method of claim 14, further comprising at least one of:
light between a flow cell front wall and an exit aperture at an angle relative to the reflected path is absorbed with the at least one light absorbing member;
reflected light at an angle relative to the reflected path is absorbed with the at least one light absorbing member;
light is not reflected into the exit aperture or along the reflected path upon contacting the at least one light absorbing member;
light does not pass through a light absorbing member on the flow cell wall; or
a light conduit absorbs light at an angle with the reflected path with the at least one light absorbing member.

16. The method of claim 15, further comprising at least one of:
light between the exit aperture and a beam splitter in a main conduit at an angle relative to the reflected path is absorbed with at least one main conduit light absorbing member;
reflected light in the main conduit at an angle relative to the reflected path is absorbed with the at least one main conduit light absorbing member in the main conduit;
light is not reflected into the beam splitter or along the reflected path upon contacting at the least one main conduit light absorbing member in the main conduit; or
a light conduit in the main conduit absorbs light at an angle with the reflected path with the at least one man conduit light absorbing member in the main conduit.

17. The method of claim 16, further comprising at least one of:
light reflected from the beam splitter to be directed into a first collection channel at an angle relative to a beam splitter reflected path is absorbed with at least one collection channel light absorbing member in the first collection channel;
reflected light in the first collection channel at an angle relative to the beam splitter reflected path is absorbed with the at least one collection channel light absorbing member in the first collection channel;
light is not reflected into an optical element in the first collection channel or along the beam splitter reflected path upon contacting at least one collection channel light absorbing member in the first collection channel; and/or
a light conduit in the first collection channel absorbs light at an angle with the beam splitter reflected path with at least one collection channel light absorbing member in the first collection channel.

18. The method of claim 17, further comprising at least one of:
light passed through the beam splitter to be directed into a second collection channel along the reflected path is absorbed with at least one collection channel light absorbing member in the second collection channel;
reflected light in the second collection channel at an angle relative to the reflected path is absorbed with the at least one collection channel light absorbing member in the second collection channel;
light is not reflected into an optical element in the second collection channel or along the reflected path upon contacting the at least one collection channel light absorbing member in the second collection channel; and/or
a light conduit in the second collection channel absorbs light at an angle with the reflected path with the at least one collection channel light absorbing member in the second collection channel.

19. The method of claim 11, further comprising:
emitting at least one interrogation light beam into the rectangular flow cell with the at least one light emitter such that the light path of the interrogation light beam has an interrogation width at the flow cell that is narrower than the flow cell width; and
wherein redirected light from a back wall of the flow cell travels toward the spherical reflector and is reflected back through the flow cell and out a front wall of the flow cell on the reflected path.

20. The method of claim 11, further comprising: obtaining a sample from a sample source;
obtaining an analyte stain from an analyte stain reservoir comprising an analyte stain composition, wherein the analyte stain composition includes a dye;
obtaining a counterstain from a counterstain reservoir comprising a counterstain composition, wherein the counterstain composition includes a different dye;
staining the sample with the analyte stain and counterstain in a reactor to obtain the stained sample; and
providing the stained sample to the flow cell for light interrogation.

21. The method of claim 20, further comprising performing a match filter analysis on the analyte stain data peaks to determine peaks that are candidates to be target analyte.

22. The method of claim 21, wherein potential target analytes are selected based on the match filtering, where the peaks determined to be candidates must be within:
  a) detection threshold range;
  b) analyte stain channel is within range;
  c) counterstain channel is within range; or
  d) ratio of analyte stain channel intensity to counterstain channel is within range.

23. The method of claim 11, wherein a system having the flow cytometer includes two reactors for staining two separate samples, and both reactors provide input into the single flow cytometer, wherein the system is configured such that the method comprises:
a first sample is heated to a temperature and stained in a first reactor to obtain a first stained sample;
the first stained sample is passed from the first reactor through the flow cytometer; while the first sample is being passed through the flow cytometer, a second reactor is
staining the second sample that has been preconditioned by being heated to the temperature to obtain a second stained sample;

after the first stained sample is completely passed through the flow cytometer, the second stained sample is passed from the second reactor through the flow cytometer; and while the second stained sample is being passed through the flow cytometer, the first reactor is staining a third sample that has been preconditioned by being heated to the temperature.

24. A method of detecting a target analyte in a sample, the method comprising:

providing a stained sample having an analyte stain and a counterstain, where the analyte stain has an analyte stain signal that is distinguishable from a counterstain signal from the counterstain;

interrogating the stained sample with light in a flow cell of a flow cytometer, wherein the flow cytometer comprises:
  at least one light emitter configured to emit light in a light path,
  wherein the flow cell comprises a rectangular flow cell having a flow cell width that is substantially lateral to the light path and a flow cell depth that is longitudinal to the light path, wherein the light path has an interrogation width at the flow cell that is narrower than the flow cell width; and
  a spherical reflector positioned adjacent to the rectangular flow cell and having a concave reflective surface that has a reflective direction that is positioned substantially orthogonal with the light path such that reflected light is reflected along a reflected path that is substantially orthogonal with the light path;

detecting a potential target, wherein the potential target is detected by detecting a presence of the analyte stain signal from the stained sample in the flow cell;

determining whether the potential target is devoid of the counterstain signal or whether the potential target has the counterstain signal below a counterstain threshold, wherein the counterstain threshold is determined as a ratio of the analyte stain signal to the counterstain signal; and determining whether the analyte stain signal and the counterstain signal have an analyte stain signal to counterstain signal ratio that is above the counterstain threshold, when the ratio is above the counterstain threshold an analyte associated with the analyte stain is present or a moiety like a cell is determined to be viable, when the ratio is below the counterstain threshold the analyte associated with the analyte stain is not present or the cell is determined to be unviable.

25. A method of detecting a target analyte in a sample, the method comprising:

providing a stained sample having an analyte stain and a counterstain, where the analyte stain has an analyte stain signal that is distinguishable from a counterstain signal from the counterstain;

interrogating the stained sample with light in a flow cell of a flow cytometer, wherein the flow cytometer comprises:
  at least one light emitter configured to emit light in a light path,
  wherein the flow cell comprises a rectangular flow cell having a flow cell width that is substantially lateral to the light path and a flow cell depth that is longitudinal to the light path, wherein the light path has an interrogation width at the flow cell that is narrower than the flow cell width; and
  a spherical reflector positioned adjacent to the rectangular flow cell and having a concave reflective surface that has a reflective direction that is positioned substantially orthogonal with the light path such that reflected light is reflected along a reflected path that is substantially orthogonal with the light path;

detecting a potential target, wherein the potential target is detected by detecting a presence of the analyte stain signal from the stained sample in the flow cell;

determining whether the potential target is devoid of the counterstain signal or whether the potential target has the counterstain signal below a counterstain threshold, wherein the counterstain threshold is determined as a ratio of the analyte stain signal to the counterstain signal; and defining a counterstain signal to analyte stain signal ratio threshold; and determining whether the counterstain signal and the analyte stain signal have a counterstain signal to analyte stain signal ratio that is below the counterstain signal to analyte stain signal ratio threshold, when the ratio is below the counterstain signal to analyte stain signal ratio threshold an analyte associated with the analyte stain is determined to be present or a moiety like a cell is determined to be viable, when the ratio is above the counterstain signal to analyte stain signal ratio threshold, the analyte associated with the analyte stain is not present or the cell is determined to be unviable.

26. A flow cytometry system comprising:

a flow cytometer, wherein the flow cytometer comprises:
  at least one light emitter configured to emit light in a light path,
  a flow cell comprising a rectangular flow cell having a flow cell width that is substantially lateral to the light path and a flow cell depth that is longitudinal to the light path, wherein the light path has an interrogation width at the flow cell that is narrower than the flow cell width; and
  a spherical reflector positioned adjacent to the rectangular flow cell and having a concave reflective surface that has a reflective direction that is positioned substantially orthogonal with the light path such that reflected light is reflected along a reflected path that is substantially orthogonal with the light path;

a computer system comprising:
  one or more processors; and
  one or more non-transitory computer readable media storing instructions that in response to being executed by the one or more processors, cause the computer system to perform operations, the operations comprising:
    causing a sample preparation system to provide a stained sample that has an analyte stain and a counterstain to the flow cytometer, where the analyte stain has an analyte stain signal that is distinguishable from a counterstain signal from the counterstain;
    causing interrogation of the stained sample with the flow cytometer to obtain flow cytometry data;
    detecting a potential target having the analyte stain from the flow cytometry data, wherein the potential target is detected by detecting a presence of the analyte stain signal from the stained sample in the flow cell of the flow cytometer;

determining whether the potential target is devoid of the counterstain signal or whether the potential target has the counterstain signal below a counterstain threshold, wherein the counterstain threshold is determined as a ratio of the analyte stain signal to the counterstain signal;

wherein the detected potential target is identified as a target analyte if the potential target has the analyte stain signal without the counterstain signal, or has the analyte stain signal and has the counterstain signal below the counterstain threshold; and determining that the target analyte is viable if the analyte stain signal is present and the counterstain signal is below the counterstain threshold, or determining that the target analyte is not viable if the counterstain signal is above the counterstain threshold, wherein the detected target analyte comprises a moiety like a cell.

* * * * *